US011212466B2

(12) United States Patent
Simolon et al.

(10) Patent No.: US 11,212,466 B2
(45) Date of Patent: Dec. 28, 2021

(54) MULTIPLE MICROBOLOMETER SELECTION FOR SIMULTANEOUS READOUT

(71) Applicant: FLIR Systems, Inc., Wilsonville, OR (US)

(72) Inventors: Brian B. Simolon, Santa Barbara, CA (US); Naseem Y. Aziz, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 16/909,768

(22) Filed: Jun. 23, 2020

(65) Prior Publication Data

US 2020/0322548 A1    Oct. 8, 2020

Related U.S. Application Data

(63) Continuation of application No. PCT/US2018/067331, filed on Dec. 21, 2018.

(60) Provisional application No. 62/611,711, filed on Dec. 29, 2017.

(51) Int. Cl.
| | | |
|---|---|---|
| *H04N 5/33* | (2006.01) | |
| *G01J 3/36* | (2006.01) | |
| *G01J 5/22* | (2006.01) | |
| *G01J 5/20* | (2006.01) | |

(52) U.S. Cl.
CPC .................. *H04N 5/33* (2013.01); *G01J 3/36* (2013.01); *G01J 5/22* (2013.01); *G01J 2005/202* (2013.01)

(58) Field of Classification Search
CPC ...... H04N 5/33; G01J 3/36; G01J 5/22; G01J 2005/202
See application file for complete search history.

(56) References Cited

U.S. PATENT DOCUMENTS

| | | | |
|---|---|---|---|
| 7,034,301 B2 | 4/2006 | Parrish et al. | |
| 7,679,048 B1 | 3/2010 | Aziz et al. | |
| 2001/0003356 A1 | 6/2001 | Yon et al. | |
| 2001/0050366 A1* | 12/2001 | Okuyama | ............... H04N 5/365 |
| | | | 257/72 |
| 2003/0213910 A1* | 11/2003 | Anderson | ............ H04N 5/3651 |
| | | | 250/338.1 |

(Continued)

*Primary Examiner* — Marcus H Taningco
(74) *Attorney, Agent, or Firm* — Haynes and Boone, LLP

(57) ABSTRACT

Techniques are disclosed for facilitating multiple microbolometer selection for simultaneous readout. In one example, a device includes a plurality of microbolometers. The plurality of microbolometers includes a first set and a second set of serially-connected microbolometers. The device further includes a first plurality of switches configured to selectively short the plurality of microbolometers. The device further includes a second plurality of switches configured to selectively couple the plurality of microbolometers to ground. The device further includes a third plurality of switches configured to selectively provide a bias signal to the plurality of microbolometers. The device further includes a processing circuit configured to configure the first plurality, second plurality, and third plurality of switches to cause simultaneous read out of one microbolometer of the first set and one microbolometer of the second set. Related methods and systems are also provided.

20 Claims, 17 Drawing Sheets

(56) References Cited

U.S. PATENT DOCUMENTS

2006/0076493 A1* 4/2006 Bluzer ................. G01J 5/08
250/338.1
2008/0048997 A1* 2/2008 Gillespie ............ G06K 9/00335
345/174

* cited by examiner

MULTIPLE MICROBOLOMETER SELECTION FOR SIMULTANEOUS READOUT

CROSS-REFERENCE TO RELATED APPLICATIONS

This application is a continuation of International Patent Application No. PCT/US2018/067331 filed Dec. 21, 2018 and entitled "MULTIPLE MICROBOLOMETER SELECTION FOR SIMULTANEOUS READOUT," which is incorporated herein by reference in its entirety.

International Patent Application No. PCT/US2018/067331 filed Dec. 21, 2018 claims priority to and the benefit of U.S Provisional Patent Application No. 62/611,711 filed Dec. 29, 2017 and entitled "MULTIPLE MICROBOLOMETER SELECTION FOR SIMULTANEOUS READOUT," which is hereby incorporated by reference in its entirety.

U.S. Provisional Patent Application No. 62/611,711 is related to U.S. Pat. No. 7,679,048 issued Mar. 16, 2010 and entitled "SYSTEMS AND METHODS FOR SELECTING MICROBOLOMETERS WITHIN MICROBOLOMETER FOCAL PLANE ARRAY" and U.S. Pat. No. 7,034,301 issued Apr. 25, 2006 and entitled "MICROBOLOMETER FOCAL PLANE ARRAY SYSTEMS AND METHODS", all of which are incorporated herein by reference in their entirety.

TECHNICAL FIELD

One or more embodiments relate generally to microbolometers and more particularly, for example, to multiple microbolometer selection for simultaneous readout.

BACKGROUND

Microbolometer structures are generally fabricated on monolithic silicon substrates to form an array of microbolometers, with each microbolometer functioning as a pixel to produce a portion of a two-dimensional image. In some cases, a change in resistance of each microbolometer is translated into a time-multiplexed electrical signal by a read out integrated circuit (ROIC). The combination of the ROIC and the array of microbolometers is commonly referred to as a microbolometer focal plane array (FPA).

SUMMARY

In one or more embodiments, a device includes a plurality of microbolometers. The plurality of microbolometers includes a first set of serially-connected microbolometers and a second set of serially-connected microbolometers. The device further includes a first plurality of switches, where each switch of the first plurality is configured to selectively short a respective one of the plurality of microbolometers. The device further includes a second plurality of switches, where each switch of the second plurality is configured to selectively couple a respective one of the plurality of microbolometers to ground. The device further includes a third plurality of switches, where each switch of the third plurality is configured to selectively provide a bias signal to a respective one of the plurality of microbolometers. The device further includes a processing circuit configured to configure the first plurality, second plurality, and third plurality of switches to cause simultaneous read out of one microbolometer of the first set and one microbolometer of the second set.

In one or more embodiments, a method includes providing a plurality of microbolometers. The plurality of microbolometers includes a first set of serially-connected microbolometers and a second set of serially-connected microbolometers. The method further includes selecting a first microbolometer of the first set and a first microbolometer of the second set. The method further includes, based on the selected first microbolometer of the first set and the selected first microbolometer of the second set: configuring a first plurality of switches to selectively short one or more of the plurality of microbolometers; configuring a second plurality of switches to selectively couple one or more of the plurality of microbolometers to ground set; and configuring a third plurality of switches to selectively provide a respective bias signal to one or more of the plurality of microbolometers. The method further includes simultaneously reading out the selected first microbolometer of the first set and the selected first microbolometer of the second set.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Figure 1:
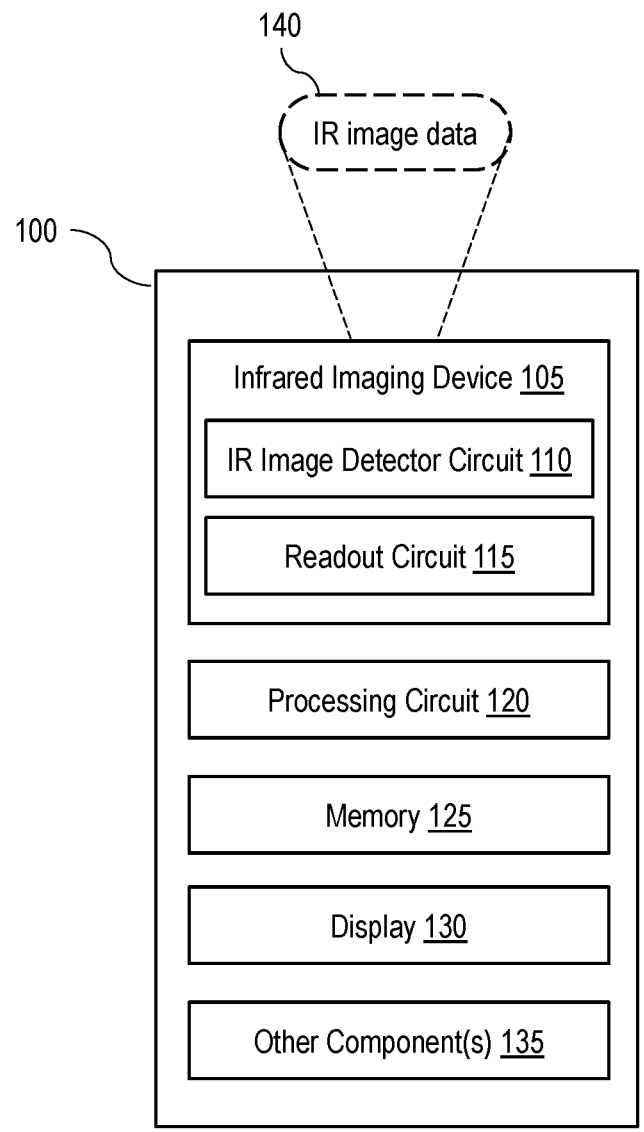
FIG. 1 illustrates a block diagram of an example imaging system in accordance with one or more embodiments of the present disclosure.

FIG. 1 illustrates a block diagram of an example imaging system 100 (e.g., a thermal IR imaging system) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 includes an infrared (IR) imaging device 105, a processing circuit 120, memory 125, a display 130, and/or other components 135. The IR imaging device 105 includes an IR image detector circuit 110 (e.g., a thermal IR detector circuit) and a readout circuit 115 (e.g., an ROIC). In some aspects, the IR image detector circuit 110 may capture (e.g., detect, sense) IR radiation with wavelengths in the range from around 700 nm to around 2 mm, or portion thereof. For example, in some aspects, the IR image detector circuit 110 may be sensitive to (e.g., better detect) mid-wave IR (MWIR) radiation (e.g., electromagnetic radiation with wavelength of 2-5 µm) and/or long-wave IR (LWIR) radiation (e.g., electromagnetic radiation with wavelength of 7-14 µm), or any desired IR wavelengths (e.g., generally in the 0.7 to 14 µm range).

The IR image detector circuit 110 may capture an IR image associated with a scene (e.g., a real world scene). To capture the IR image, the IR image detector circuit 110 may detect IR image data 140 (e.g., in the form of IR radiation) associated with the scene and generate pixel values of the IR image based on the IR image data 140. An IR image may be referred to as an IR frame or an IR image frame. In some cases, the IR image detector circuit 110 may include an array of IR detectors that can detect IR radiation, convert the detected IR radiation into electrical signals (e.g., voltages, currents, etc.), and generate the pixel values based on the electrical signals. Each IR detector in the array may capture a respective portion of the IR image data 140 and generate a pixel value based on the respective portion captured by the IR detector. The pixel value generated by the IR detector may be referred to as an output of the IR detector. The IR detector may be referred to as a detector, sensor, or IR sensor.

The IR image may be, or may be considered, a data structure that includes pixels and is a representation of the IR image data 140, with each pixel having a pixel value that represents IR radiation emitted or reflected from a portion of the scene and received by an IR detector that generates the pixel value. Based on context, a pixel may refer to an IR detector of the IR image detector circuit 110 that generates an associated pixel value or a pixel (e.g., pixel location, pixel coordinate) of the IR image formed from the generated pixel values.

In an aspect, the pixel values generated by the IR image detector circuit 110 may be represented in terms of digital count values generated based on the electrical signals obtained from converting the detected IR radiation. For example, in a case that the IR image detector circuit 110 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the IR detector may be the digital count value output from the ADC circuit. In other cases (e.g., in cases without an ADC circuit), the pixel value may be analog in nature with a value that is, or is indicative of, the value of the electrical signal. In general, a larger amount of IR radiation being incident on and detected by the IR image detector circuit 110 is associated with higher digital count values and higher temperatures.

The readout circuit 115 may be utilized as an interface between the IR image detector circuit 110 that detects the IR image data 140 and the processing circuit 120 that processes the detected IR image data 140 as read out by the readout circuit 115. An image capturing frame rate may refer to the rate (e.g., images per second) at which IR images are detected in a sequence by the IR image detector circuit 110 and provided to the processing circuit 120 by the readout circuit 115. The readout circuit 115 may read out the pixel values generated by the IR image detector circuit 110 in accordance with an integration time (e.g., also referred to as an integration period). Integration time for a detector may correspond to an amount of time that incoming radiation striking the detector is converted to electrons that are stored prior to a signal being read (e.g., in an integration capacitor that may be opened or shorted).

In various embodiments, a combination of the IR image detector circuit 110 and the readout circuit 115 may be, may include, or may together provide an FPA. In some aspects, the IR image detector circuit 110 may include an array of microbolometers, and the combination of the IR image detector circuit 110 and the readout circuit 115 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the IR imaging device 105 may include one or more filters adapted to pass IR radiation of some wavelengths but substantially block IR radiation of other wavelengths (e.g., MWIR filters, thermal IR filters, and narrow-band filters). Such filters may be utilized to tailor the IR imaging device 105 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

The processing circuit 120 may perform operations to process the pixel values received from the readout circuit 115. By way of non-limiting example, the processing circuit 120 may perform operations such as non-uniformity correction (NUC), spatial and/or temporal filtering, and/or radiometric conversion on the pixel values. The processing circuit 120 may be implemented as any appropriate processing device, such as a central processing unit (CPU), a graphics processing unit (GPU), a digital signal processor (DSP), a logic device, a microcontroller, an application specific integrated circuit (ASIC), a programmable logic device (PLD), a combination thereof, and/or other device. The processing circuit 120 may include combinations of hardware and software processing functionality and may be provided with/in and/or communicatively coupled to other components to execute appropriate instructions, such as software instructions and/or processing parameters (e.g., filtering coefficients, NUC correction terms) stored in the memory 125. In various embodiments, the processing circuit 120 may be configured to execute software instructions stored in the memory 125 to perform various methods, processes, or operations in the manner described herein. In some aspects, the readout circuit 115 and/or processing circuit 120 may include and/or may be coupled to circuitry to generate and provide clock signals and/or control signals for facilitating readout of image data captured by the IR image detector circuit 110. In some cases, the clock signals and control signals may provide appropriate timing for setting switches to a desired state (e.g., on or off state).

The memory 125 may be utilized to store information for facilitating operation of the imaging system 100. The memory 125 may store information such as instructions to be executed by the various components (e.g., the readout circuit 115 and/or processing circuit 120) of the imaging system 100, parameters associated with processing operations (e.g., microbolometer switching scheme), information associated with previously generated images (e.g., for temporal filtering), and/or other information. By way of non-limiting examples, the memory 125 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 125 may include volatile memory, such as random-access memory (RAM), dynamic RAM (DRAM), static RAM (SRAM), etc. In some aspects, the memory 125, or a portion thereof, may be external to the imaging system 100 (e.g., an external memory accessible by the imaging system 100).

The display 130 (e.g., screen, touchscreen, monitor) may be used to display captured and/or processed images and/or other images, data, and/or information (e.g., legend relating color in the images with temperatures). For example, the images (or a visual representation of the images) may be displayed as individual static images and/or as a series of images in a video sequence. In addition, the imaging system 100 may include other components 135. By way of non-limiting examples, the other components 135 may be used to implement any features of the imaging system 100 as may be desired for various applications, such as clocks, batteries, motion sensors, temperature sensors, visible-light imaging device, communications components, and/or other components.

As one example, motion sensors may be implemented by one or more accelerometers, gyroscopes, and/or other appropriate devices that may be used to detect movement of the imaging system 100. The information provided by the motion sensors may facilitate image processing operations (e.g., spatial filtering, temporal filtering) performed by the processing circuit 120, such as by facilitating differentiation between motion in the scene relative to motion of the imaging system 100. As another example, communications components may facilitate wired and/or wireless communication between components within the imaging system 100 and/or between the imaging system 100 and other systems. Examples of communications components may include components (e.g., interfaces, connections) for facilitating communication using Universal Serial Bus (USB), Ethernet, WiFi, Bluetooth, cellular, infrared, radio, and/or other wired or wireless protocols.

Figure 2:
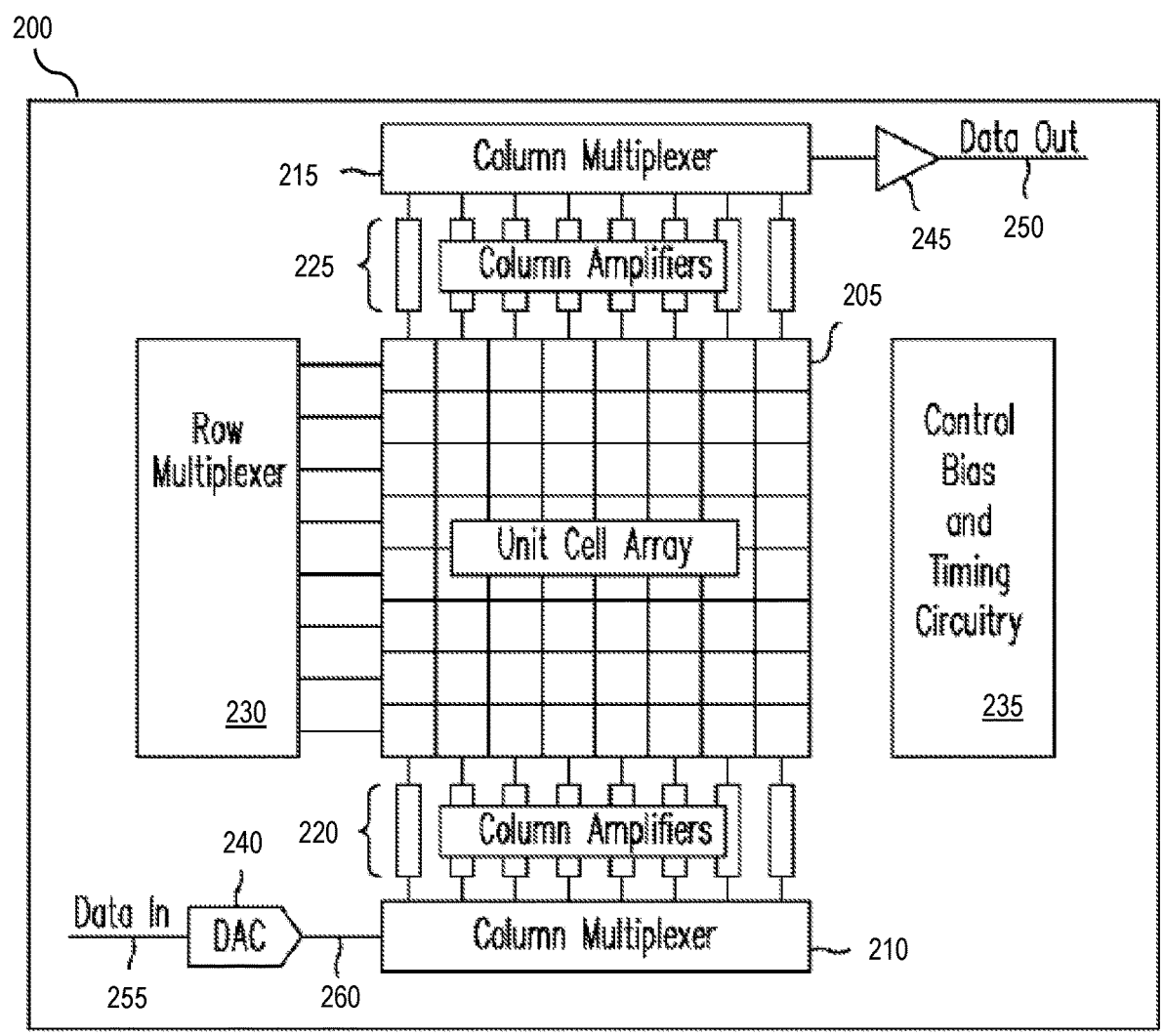
FIG. 2 illustrates a block diagram of an example FPA in accordance with one or more embodiments of the present disclosure.

FIG. 2 illustrates a block diagram of an example FPA 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the FPA 200 may include, may be a part of, and/or may be collectively provided by the IR image detector circuit 110 and readout circuit 115. In some aspects, the FPA 200 may be a microbolometer FPA.

The FPA 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. The unit cell array 205 includes an array of unit cells. In an aspect, each unit cell may include a detector (e.g., microbolometer) and interface circuitry.

The interface circuitry of each unit cell may provide an output signal, such as an output voltage or current, in response to the detector signal provided by the detector of the unit cell. The output signal may be indicative of the magnitude of EM radiation received by the detector.

The column multiplexer 215, column amplifiers 220, row multiplexer 230, and data output buffer 245 may be used to provide the output signals from the unit cell array 205 as a data output signal on a data output line 250. The data output signal may be an image formed of the pixel values for the FPA 200. In this regard, the column multiplexer 215, column amplifiers 220, row multiplexer 230, and data output buffer 245 may collectively provide an ROIC (or portion thereof) of the FPA 200.

In an aspect, the column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array traverses to get to the column multiplexer 215. As another example, the column amplifiers 225 may include an ADC for converting analog signals to digital signals. These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells.

In an aspect, the control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the readout circuit 115 and/or processing circuit 120 of FIG. 1.

In an aspect, the FPA 200 may be implemented as part of an imaging system (e.g., 100). In addition to the various components of the FPA 200, the imaging system may also include one or more processors, memories, logic, displays, interfaces, lenses, and/or other components as may be appropriate in various implementations. In an aspect, the data output signal on the data output line 250 may be provided to the processors (not shown) for further processing. For example, the data output signal may be an image formed of the pixel values from the unit cells of the FPA 200. The processors may perform operations such as NUC, spatial and/or temporal filtering, and/or other operations. The images (e.g., processed images) may be stored in memory (e.g., external to or local to the imaging system) and/or displayed on a display device (e.g., external to and/or integrated with the imaging system).

By way of non-limiting examples, the unit cell array 205 may include 512×512 (e.g., 512 rows and 512 columns of microbolometers), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In some aspects, an array of microbolometers may include microbolometers with contacts shared between adjacent microbolometers. By having contacts shared between adjacent microbolometers, chip real estate may be conserved as fewer contacts are used relative to a case in which contacts are not shared. As such, more area on the chip may be used to provide microbolometers to detect scene energy, rather than for providing contacts. In some cases, the microbolometers and associated selection circuitry (e.g., timing and control of switches coupled to the microbolometers) may be provided to reduce crosstalk, capacitive degradations, and/or switch resistance that may be associated with shared contacts or use thereof.

In some embodiments, techniques are provided to allow selection of multiple microbolometers of a microbolometer array for simultaneous or substantially simultaneous read out, thus providing a higher sampling rate (e.g., also referred to as read out rate). In some aspects, such techniques may involve additional switches and specific timing applied to operate the switches to facilitate such read out. In some cases, the specific timing may reduce detrimental parasitic characteristics (e.g., parasitic resistance, parasitic capacitance) and/or other performance issues, thus providing improved performance. The higher speed sampling may be utilized in applications involving large arrays, high frame rates, and/or other applications. In an embodiment, the techniques may allow selection of two microbolometers for simultaneous or substantially simultaneous readout to provide doubling of the sampling rate relative to a case in which such techniques are not employed. In some aspects, a higher sampling rate may be implemented with microbolometers that have shared contacts.

FIGS. 3A through 3F illustrate an example sequence of operations of a circuit 300 with a microbolometer string 305 and an associated selection circuitry for facilitating multiple microbolometer selection for simultaneous readout in accordance with one or more embodiments of the present disclosure. The sequence of operations of the circuit 300 is described with reference to FIG. 4, which illustrates an example timing diagram 400 for the selection circuitry of FIGS. 3A-3F for facilitating read out of the microbolometer string 305 (e.g., a microbolometer array that includes the microbolometer string 305) in accordance with one or more embodiments of the present disclosure.

The microbolometer string 305 of the circuit 300 includes microbolometers 305A-J. Each of contacts 310A-I is shared by adjacent microbolometers of the microbolometer string 305. For example, the microbolometers 305B and 305C share the contact 310C, and the microbolometers 305C and 305D share the contact 310D. By sharing contacts, the number of contacts for the microbolometer is reduced and, consequently, the amount of area needed for contacts is reduced. In an embodiment, the microbolometer string 305 may be, or may be a part of, a row or a column in an array of microbolometers (e.g., unit cell array 205). In some cases, the contacts 310A-I may be shared between adjacent columns or rows (e.g., also referred to as neighboring columns or rows) of the array. It is noted that reference to a column or a row may include a partial column or a partial row and that the column and row terminology may be interchangeable, depending upon the application. For explanatory purposes, the microbolometer string 305 is a column (or portion thereof) of the array, and each of the microbolometers 305A-J is part of a different row of the array.

The selection circuitry of the circuit 300 includes bolometer short (BS) switches 315A-J, switches 320A-L, and switches 325A-J. The BS switches 315A-J are in parallel with respective microbolometers 305A-J. In FIGS. 3A-3F, each of the BS switches 315A-J, switches 320A-L, and switches 325A-J is controlled by a control signal depicted adjacent to the associated switch. For example, a control signal SHE can be asserted to turn on (e.g., close) and deasserted to turn off (e.g., open) the BS switch 315E, and a control signal RSF can be asserted to turn on and deasserted to turn off the switch 325F. In an aspect, the control signals (e.g., with appropriate timing) may be provided to the selection circuitry by a readout circuit (e.g., 115) and/or a processing circuit (e.g., 120).

In an embodiment, the BS switches 315A-J, switches 320A-L, and 325A-J can be operated (e.g., turned on, turned off) with appropriate timing to allow simultaneous read out of two microbolometers of the microbolometer string 305. To facilitate such simultaneous read out, in an embodiment, such as shown in FIGS. 3A-3F, the circuit 300 may be divided into a top half and a bottom half, with one microbolometer of the top half and one microbolometer of the bottom half being read out simultaneously or substantially simultaneously. The top half of the microbolometer string 305 includes the microbolometers 305A-E, and the bottom half of the microbolometer string 305 includes the microbolometers 305F-J, respectively. A separate ground may be used for the top half of the microbolometer string 305 (e.g., top half of the microbolometer array that includes the microbolometer string 305) and a bottom half of the microbolometer string 305 to increase (e.g., maximize) isolation and reduce (e.g., minimize) crosstalk. A separate bias level may be provided for (e.g., applied to) the top half and the bottom half of the microbolometer string 305 to allow each half of the microbolometer string 305 to be read out simultaneously. In this regard, the microbolometers 305A-E may be selectively coupled to a ground 330 via a line 340 (e.g., ground line) and/or selectively provided a bias (e.g., bias voltage) via a line 350 (e.g., bias line), and the microbolometers 305F-J may be selectively coupled to a ground 335 via a line 345 and/or selectively provided a bias via a line 355.

Figure 3A:
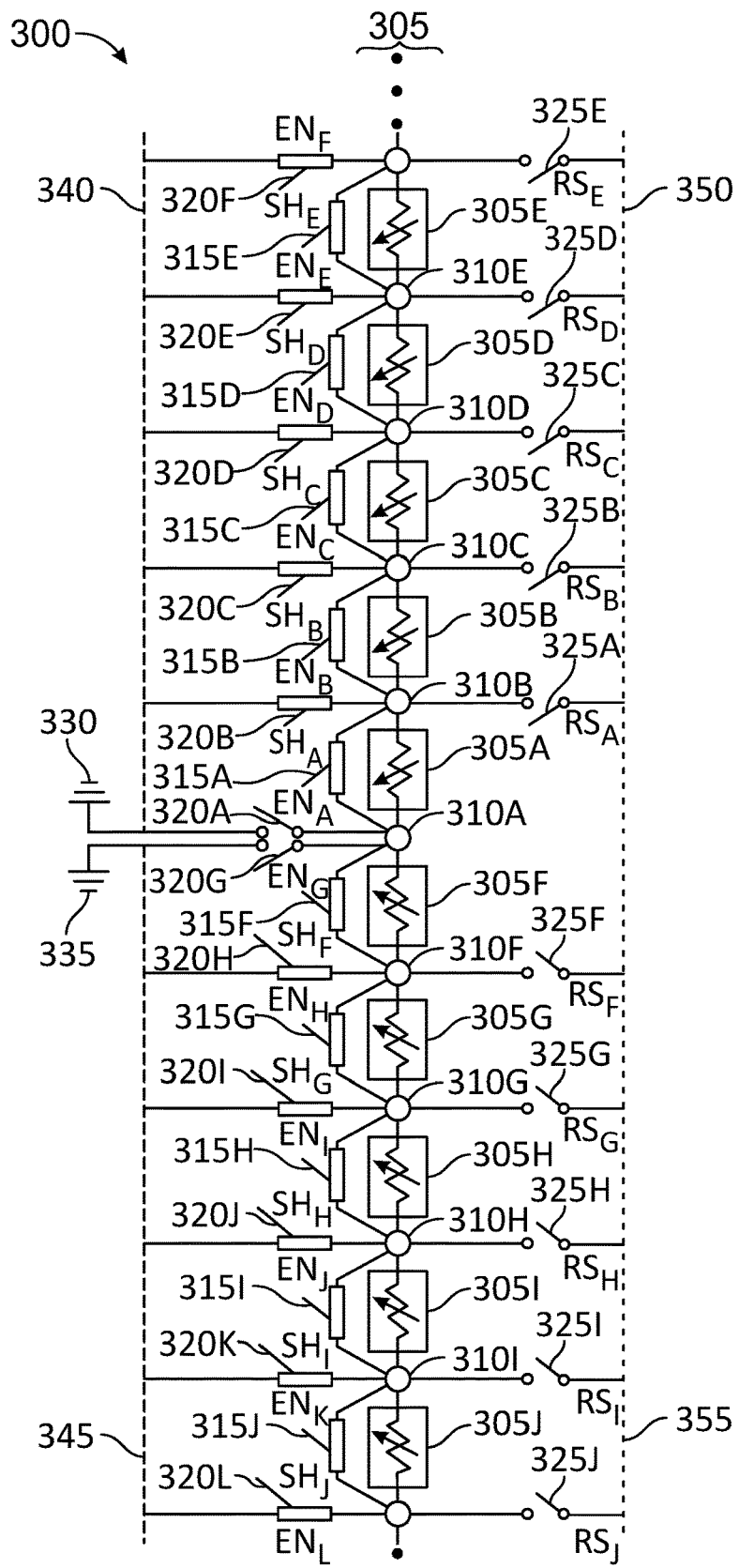
FIGS. 3A through 3F illustrate an example sequence of operations of a circuit with a microbolometer string and an associated selection circuitry for facilitating multiple microbolometer selection for simultaneous readout in accordance with one or more embodiments of the present disclosure.
Figure 3B:
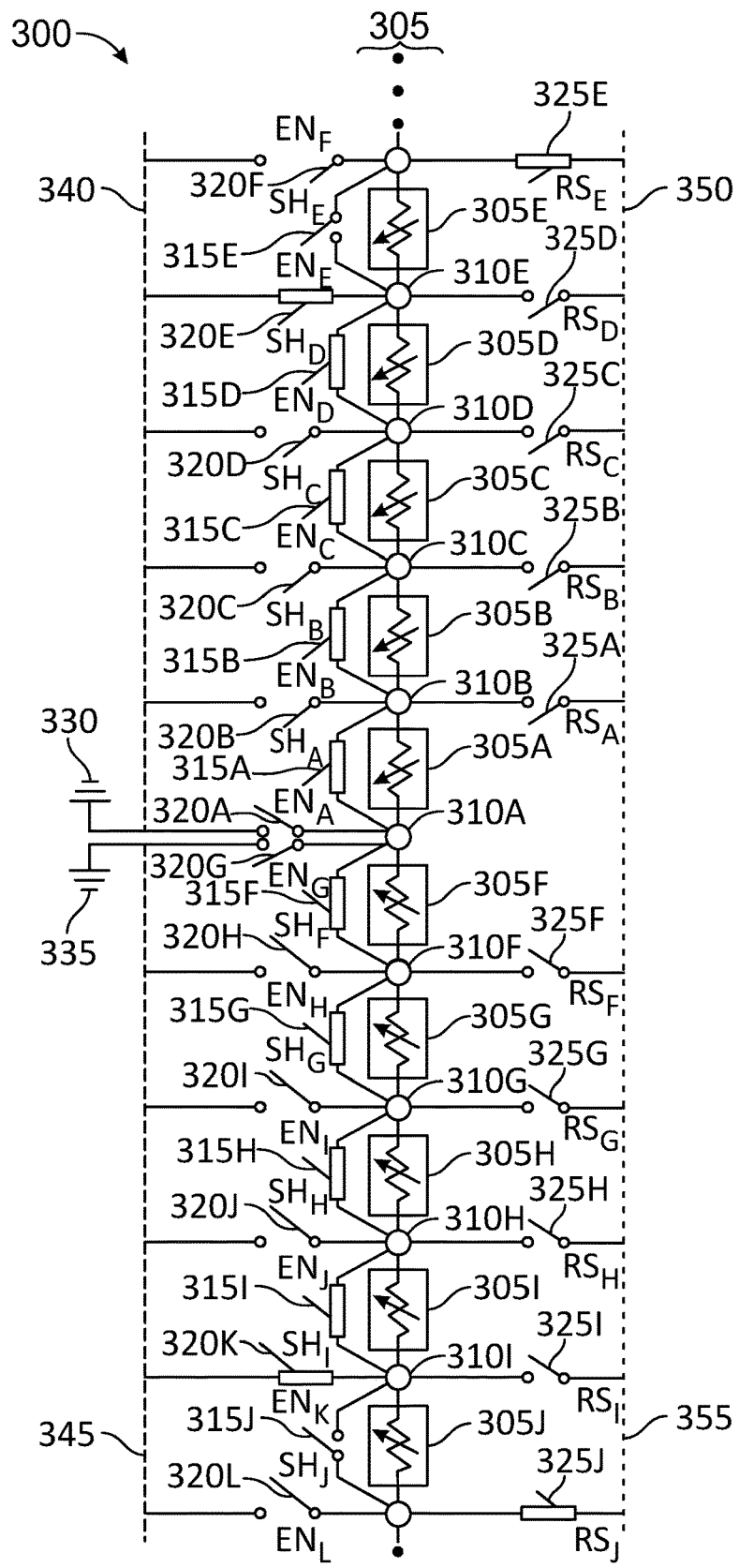
Figure 3C:
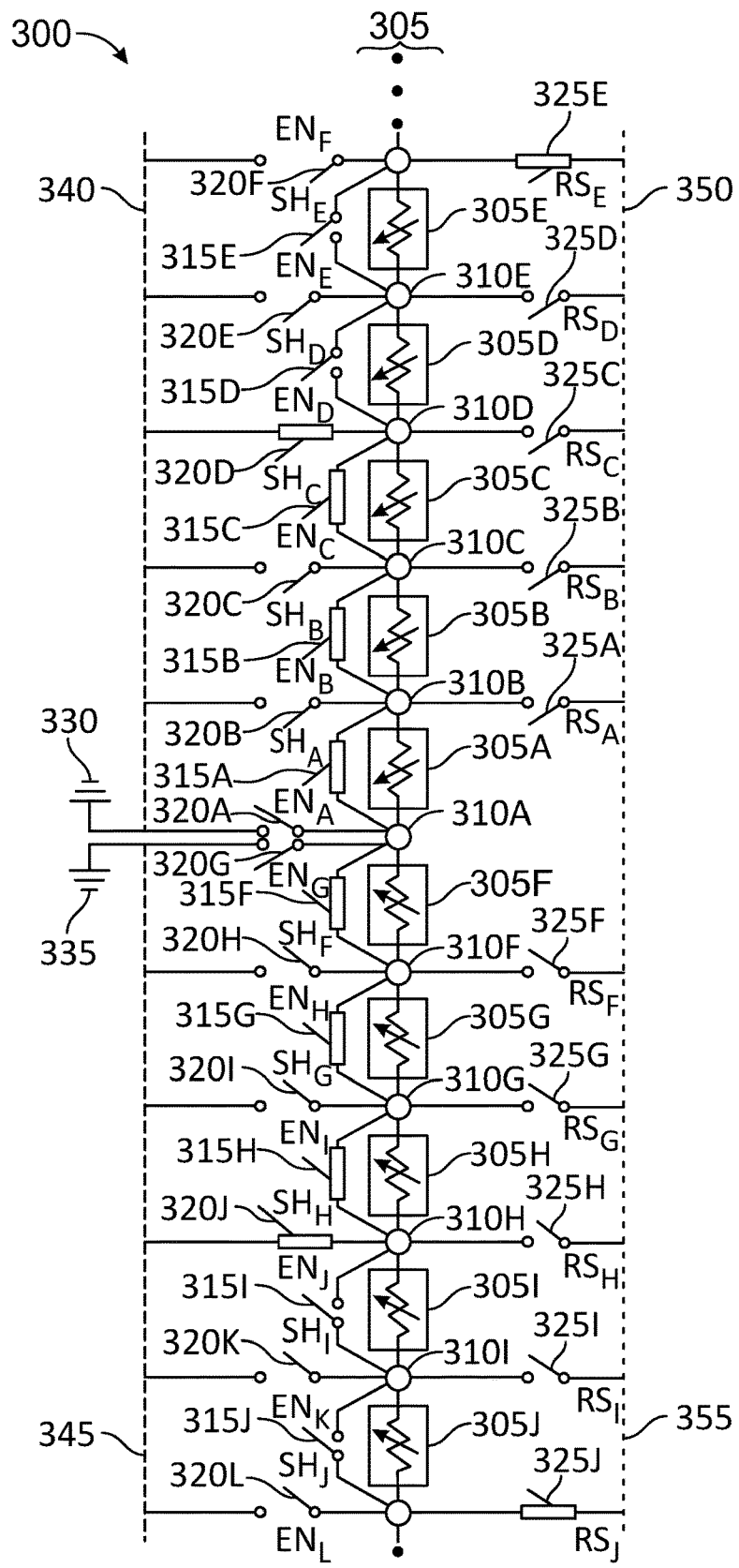
Figure 3D:
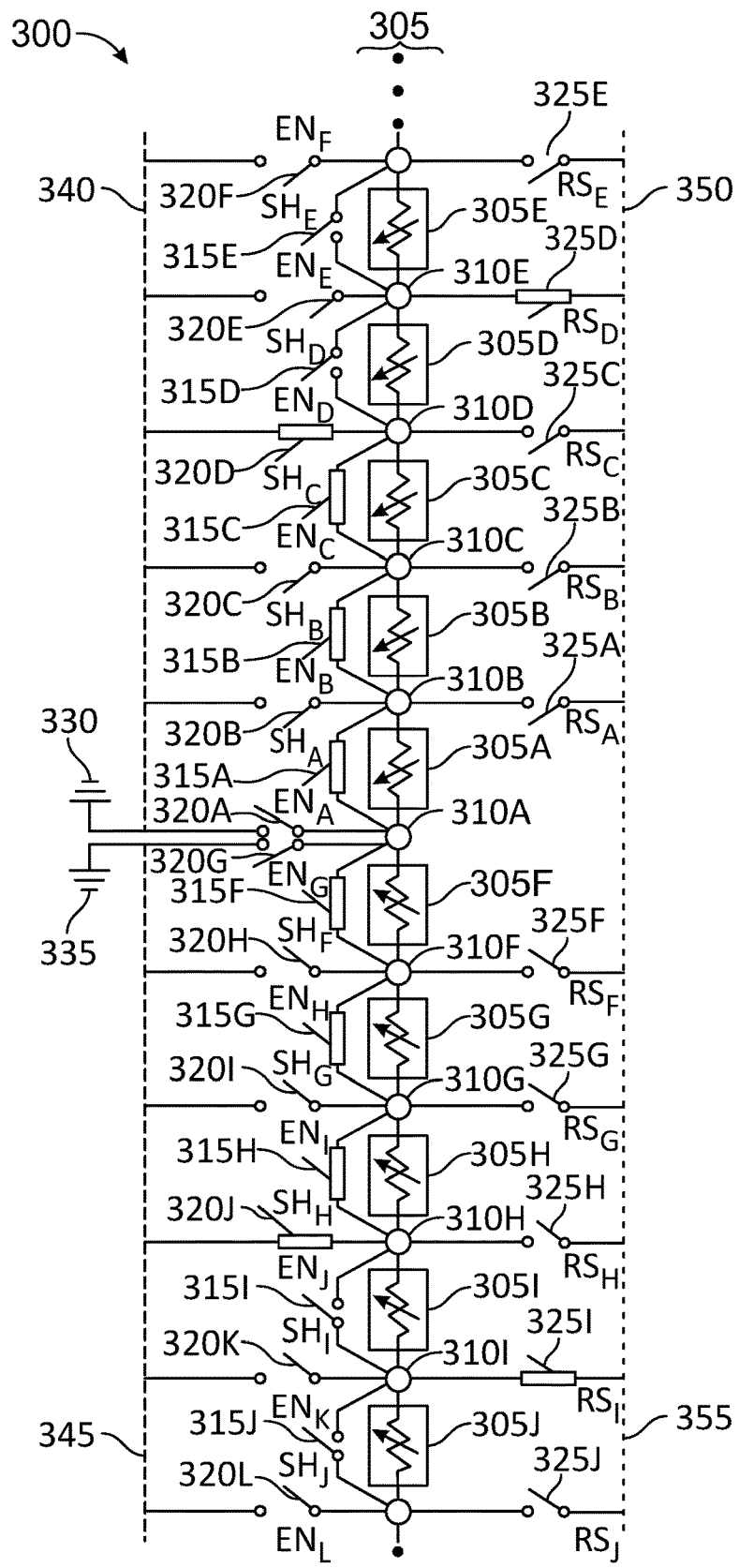
Figure 3E:
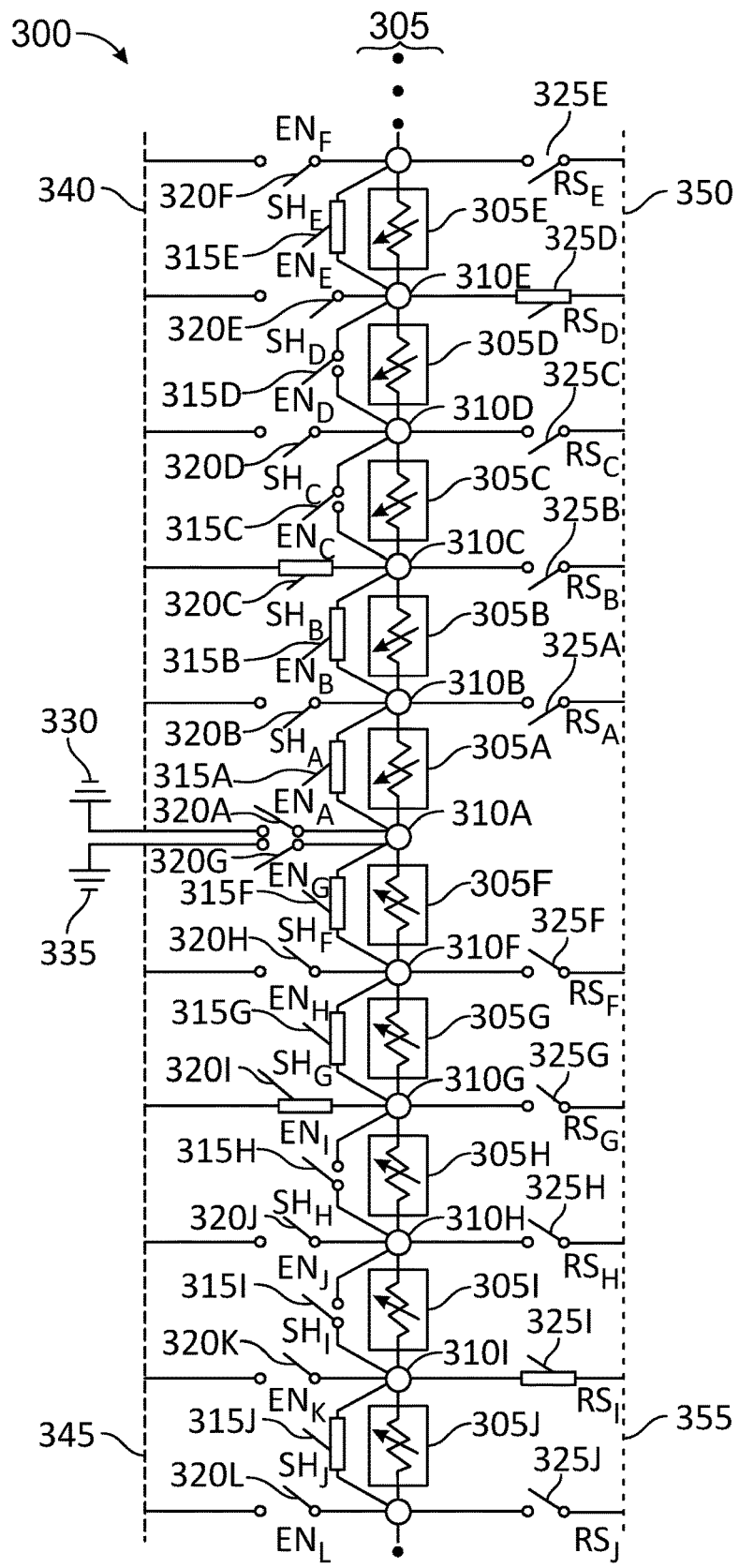
Figure 3F:
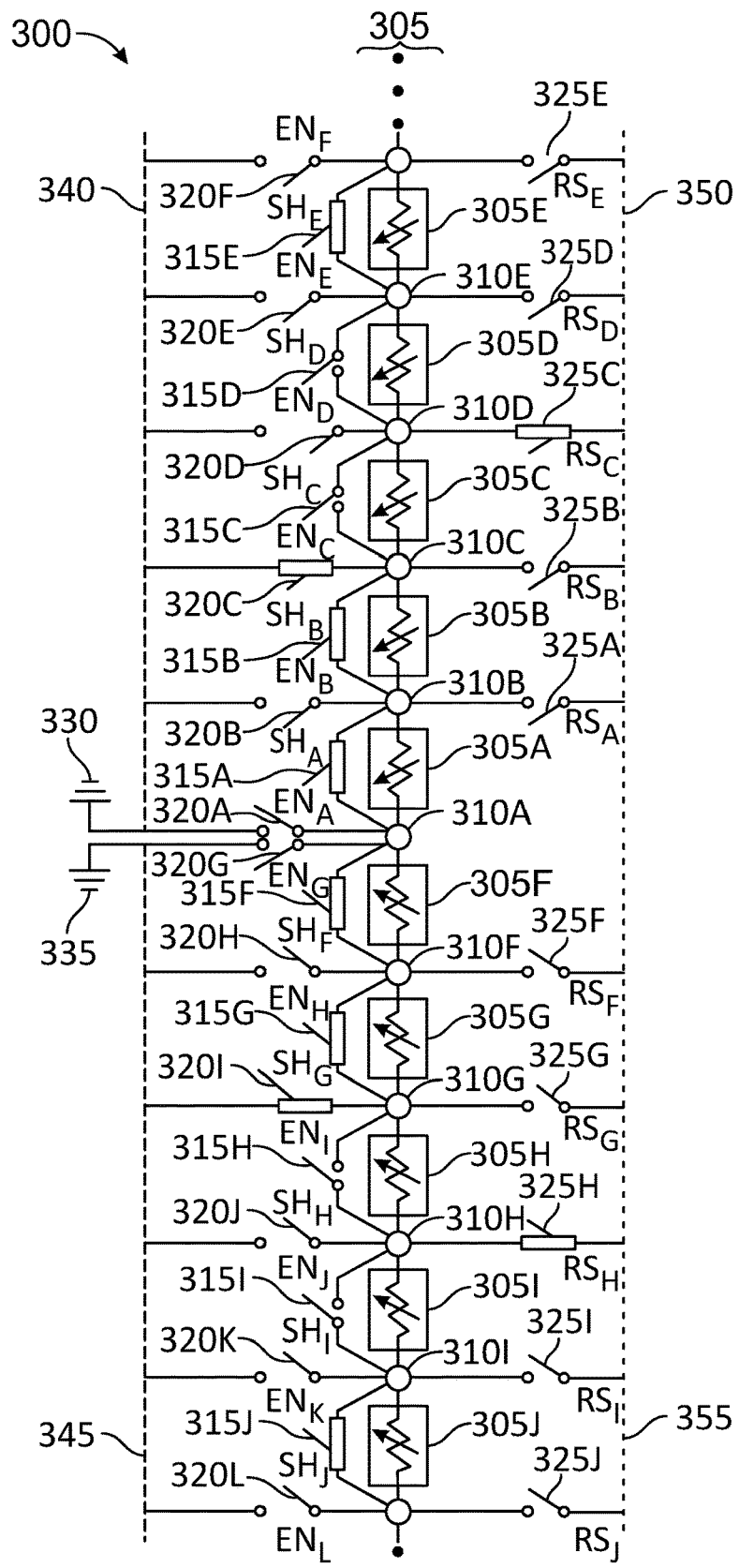
Figure 4:
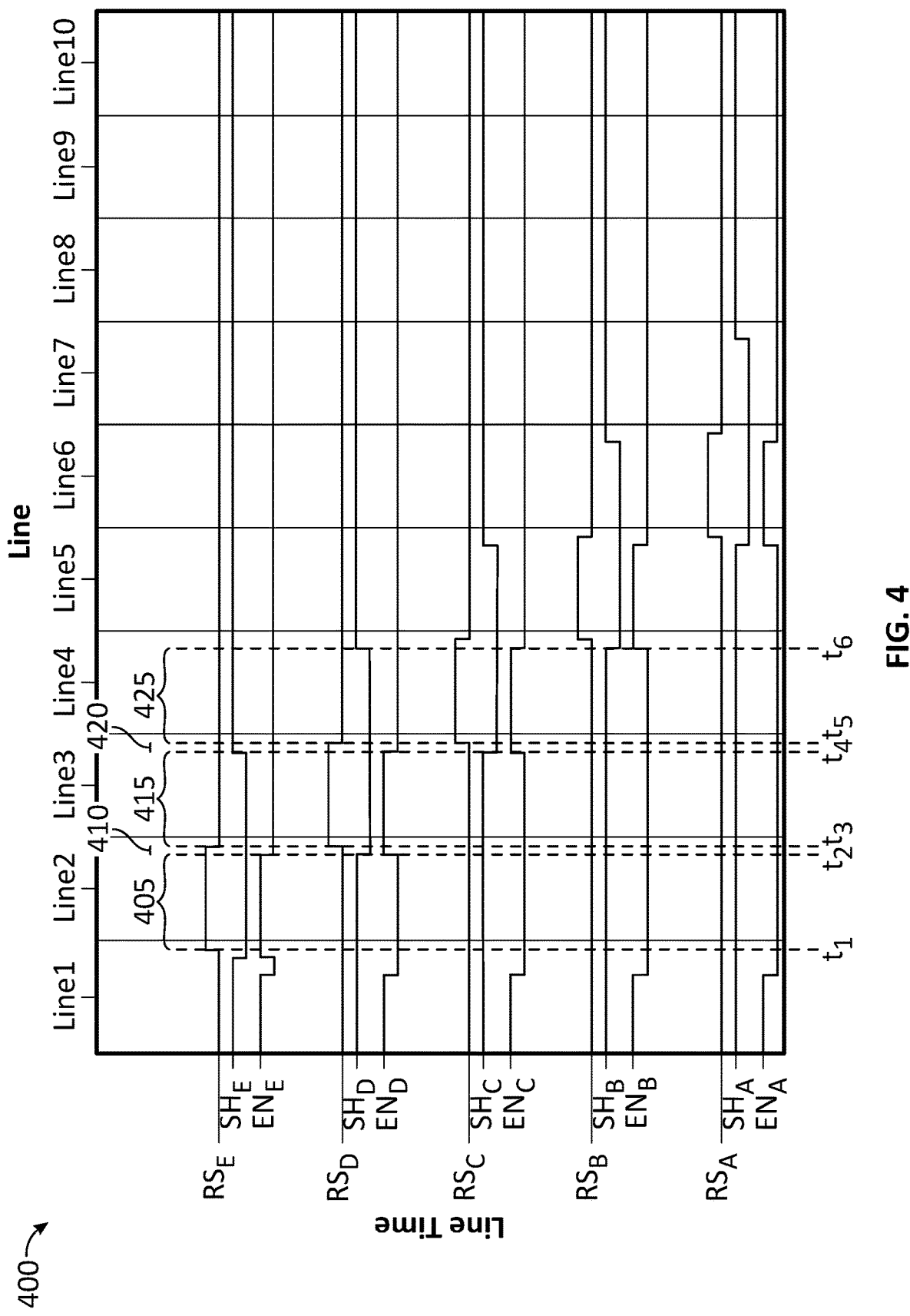
FIG. 4 illustrates an example timing diagram for the selection circuitry of FIGS. 3A-3F for facilitating multiple microbolometer selection for simultaneous readout of the microbolometer string in accordance with one or more embodiments of the present disclosure.

In an aspect, specific switching schemes (e.g., timing of on or off state of each switch) associated with the selection circuitry of the circuit 300 shown in FIGS. 3A-3F and the timing diagram 400 shown in FIG. 4 may facilitate reduced sensitivity to defects (e.g., column-to-column short defect), less noise, less crosstalk, and/or reduced parasitic capacitance within the microbolometer FPA. For example, the switches 320A-L may be used to allow selection of a desired row within the microbolometer array and the BS switches 315A-J may be used to isolate their respective microbolometers 305A-J (e.g., from column-to-column short defects). In some cases, a previously read out microbolometer and its associated portion of the selection circuitry may be used to isolate a microbolometer that currently being read out.

For explanatory purposes, in FIGS. 3A-3F and 4, each of the switches (e.g., 315A-J, 320A-L, and 325A-J) turns on in response to a logic high control signal and turns off in response to a logic low signal. However, depending on type of switching technology utilized, a switch may turn off in response to a logic high control signal and turn on in response to a logic low control signal.

In FIG. 3A, at a start of a frame (e.g., prior to read out), the BS switches 315A-J and switches 320A-L are closed, and the switches 325A-J are open. Thus, the top half of the microbolometer string 305 is shorted to the ground 330, and the bottom half of the microbolometer string 305 is shorted to the ground 335.

In FIG. 3B, simultaneous or substantially simultaneous read out is facilitated for the pixel values captured by the microbolometer 305E and 305J of the top half and bottom half, respectively, of the microbolometer string 305. To facilitate read out of the microbolometer 305E, the switch 320E and switch 325E are closed, and the BS switch 315E and switches 320A-D and 320F are opened from their respective open and closed positions in FIG. 3A. With the switch 320E closed, the microbolometer 305E is tied to the ground 330. With the switch 325E closed, a bias voltage may be applied to the microbolometer 305E. With a voltage difference across the microbolometer 305E (e.g., voltage bias applied on one side of the microbolometer 305E through the switch 325E and other side of the microbolometer 305E connected to the ground 330 via the switch 320E), a current may flow through the switches 325E, microbolometer 305E, and switch 320E. Thus, the pixel value captured by the microbolometer 305E may be read out of the microbolometer 305E, with such signal being provided by the microbolometer 305E to associated or additional circuitry of an associated ROIC.

Similarly, to allow read out of the microbolometer 305J, the switch 320K and switch 325J are closed, and the BS switch 315J and switches 320G-J and 320L are opened from their respective open and closed positions in FIG. 3A. With the switch 320K closed, the microbolometer 305J is tied to the ground 335. With the switch 325J closed, a bias voltage may be applied to the microbolometer 305J. With a voltage difference across the microbolometer 305J (e.g., voltage bias applied on one side of the microbolometer 305J through the switch 325J and other side of the microbolometer 305J connected to the ground 335 via the switch 320K), a current may flow through the switches 325J, microbolometer 305J, and switch 320K. Thus, the pixel value captured by the microbolometer 305J may be read out of the microbolometer 305J, with such signal being provided by the microbolometer 305J to associated or additional circuitry of the associated ROIC.

In an aspect, a portion 405 of the timing diagram 400 is associated with operation of the microbolometer string 305 as shown in FIG. 3B. The portion 405 goes from a time $t_1$ to a time $t_2$. At a time $t_1^+$ (e.g., immediately after time $t_1$ shown in FIG. 4), the $RS_E$ and $EN_E$ control signals are asserted (e.g., logic high) and the $SH_E$ control signal is deasserted (e.g., logic low), while the $SH_D$ control signal is asserted and the $RS_D$ and $EN_D$ control signals are deasserted. With regard to the other control signals, the $SH_C$, $SH_B$, and $SH_A$ control signals are asserted, while the $RS_C$, $EN_C$, $RS_B$, $EN_B$, $RS_A$, and $EN_A$ control signals are deasserted.

In FIG. 3C, to transition away from reading out the microbolometer 305E and transition to allowing read out of the microbolometer 305D, the switch 320E is opened, BS switch 315D is opened, and switch 320D is closed from their respective positions shown in FIG. 3B. During the transition, the switch 325E remains closed and switch 325D remains open. Similarly, to transition away from reading out the microbolometer 305J and transition to allowing read out of the microbolometer 305I the switch 320K is opened, BS switch 315I is opened, and switch 320J is closed from their respective positions shown in FIG. 3B. During the transition, the switch 325J remains closed and switch 325I remains open. As such, during the transition due to a non-overlap time (e.g., brief non-overlap time) between the deassertion of the control signal $EN_E$ and the eventual assertion of the control signal $RS_D$, current flows through the microbolometers 305D and 305E. Similarly, during the transition, current flows through the microbolometers 305I and 305J. During this time, the microbolometers 305D and 305E may be referred to as both being enabled, and similarly the microbolometers 305I and 305J may be referred to as both being enabled.

In an aspect, a portion 410 of the timing diagram 400 is associated with operation of the circuit 300 as shown in FIG. 3C. The portion 410 goes from a time $t_2$ to a time $t_3$. At a time $t_2^+$, the $RS_E$ control signal is asserted and the $SH_E$ and $EN_E$ control signals are deasserted, while the $EN_D$ control signal is asserted and the $RS_D$ and $SH_D$ control signals are deasserted. With regard to the other control signals, the $SH_C$, $SH_B$, and $SH_A$ control signals are asserted, while the $RS_C$, $EN_C$, $RS_B$, $EN_B$, $RS_A$, and $EN_A$ control signals are deasserted.

In FIG. 3D, the pixel values captured by the microbolometer 305D and 305I of the top half and bottom half, respectively, of the microbolometer string 305 are read out simultaneously or substantially simultaneously. To allow read out of the microbolometer 305D, the switch 325D is closed and switch 325E is opened from their respective positions shown in FIG. 3C, while the BS switch 315D remains opened and switch 320D remains closed. A current flows through the switch 325D, microbolometer 305D, and switch 320D. The microbolometer 305E, with the BS switch 315E open, may function to isolate the microbolometer 305D, such as from a potential short (e.g., a column-to-column defect) at a node associated with the contact 310E. During this time, the microbolometer 305E may be referred to as an isolation microbolometer.

Similarly, to allow read out of the microbolometer 305I the switch 325I is closed and switch 325J is opened from their respective positions shown in FIG. 3C, while the BS switch 315I remains opened and switch 320J remains closed. A current flows through the switch 325I, microbolometer 305I, and switch 320J. The microbolometer 305J, with the BS switch 315J open, may function to isolate the microbolometer 305I, such as from a potential short (e.g., a column-to-column defect) at a node associated with the contact 310I.

In an aspect, a portion 415 of the timing diagram 400 is associated with operation of the circuit 300 as shown in FIG. 3D. The portion 415 goes from a time $t_3$ to a time $t_4$. At a time $t_3^+$, the $RS_E$, $SH_E$, and $EN_E$ control signals are deasserted, while the $RS_D$ and $EN_D$ control signals are asserted and the $SH_D$ control signal is deasserted. With regard to the other control signals, the $SH_C$, $SH_B$, and $SH_A$ control signals are asserted, while the $RS_C$, $EN_C$, $RS_B$, $EN_B$, $RS_A$, and $EN_A$ control signals are deasserted.

In FIGS. 3C and 3D, the BS switch 315E remains open to isolate the microbolometer 305D (e.g., the microbolometer currently being read out) from microbolometers above the microbolometer 305D (e.g., isolate from the microbolometer 305E). Similarly, the BS switch 315J remains open to isolate the microbolometer 305I from microbolometers below the microbolometer 305I (e.g., isolate from the microbolometer 305J). In this case, the microbolometers 305E and 305J may be referred to as isolation microbolometers. In some cases, the high resistance provided by the opened BS switches 315E and 315J may provide isolation (e.g., from column-to-column shorts), while other microbolometers are shorted out to minimize a time constant (e.g., RC time constant) of an entire microbolometer string, which may be or may include the microbolometer string 305.

In FIG. 3E, to transition away from reading out the microbolometer 305D and transition to allowing read out of the microbolometer 305C, the switch 320D is opened, BS switch 315C is opened, and switch 320C is closed from their respective positions shown in FIG. 3D. During the transition, the switch 325D remains closed and switch 325C remains open. Similarly, to transition away from reading out the microbolometer 305I and transition to allowing read out of the microbolometer 305H, the switch 320J is opened, the BS switch 315H is opened, and switch 320I is closed from their respective positions shown in FIG. 3D. During the transition, the switch 325I remains closed and switch 325H remains open. As such, during the transition, current flows through the microbolometers 305C-D and the microbolometers 305H-I. The BS switches 315E and 315J are closed. In some cases, the BS switches 315E and 315J were previously open to provide isolation, and are closed to minimize a time constant (e.g., RC time constant) of an entire microbolometer string.

In an aspect, a portion 420 of the timing diagram 400 is associated with operation of the circuit 300 as shown in FIG. 3E. The portion 420 goes from a time $t_4$ to a time $t_5$. At a time $t_4^+$, the $SH_E$ and $EN_C$ control signals are asserted and the $EN_D$ and $SH_C$ control signals are deasserted. With regard to the other control signals, the $RS_D$, $SH_B$, and $SH_A$ control signals are asserted and the $RS_E$, $EN_E$, $SH_D$, $RS_C$, $RS_B$, $EN_B$, $RS_A$, and $EN_A$ control signals are deasserted.

In FIG. 3F, the pixel values captured by the microbolometer 305C and 305H of the top half and bottom half, respectively, of the microbolometer string 305 are read out simultaneously or substantially simultaneously. To allow read out of the microbolometer 305C, the switch 325C is closed and switch 325D is opened from their respective positions shown in FIG. 3E, while the BS switch 315C remains opened and switch 320C remains closed. A current flows through the switch 325C, microbolometer 305C, and switch 320C. Similarly, to allow read out of the microbolometer 305H, the switch 325H is closed and switch 325I is opened from their respective positions shown in FIG. 3E, while the BS switch 315H remains opened and switch 320I remains closed. A current flows through the switch 325H, microbolometer 305H, and switch 320I.

In an aspect, a portion 425 of the timing diagram 400 is associated with operation of the circuit 300 as shown in FIG. 3F. The portion 425 goes from a time $t_5$ to a time $t_6$. At a time $t_5^+$, the $RS_C$ control signal is asserted and the $RS_D$ control signals is deasserted. With regard to the other control signals, the $SH_E$, $EN_C$, $SH_B$ and $SH_A$ control signals are asserted and the $RS_E$, $EN_E$, $SH_D$, $EN_D$, $SH_C$, $RS_B$, $EN_B$, $RS_A$, and $EN_A$ control signals are deasserted.

In FIGS. 3E and 3F, the BS switch 315D remains open to isolate the microbolometer 305C from microbolometers above the microbolometer 305C (e.g., isolate from the microbolometers 305E and 305D). Similarly, the BS switch 315I remains open to isolate the microbolometer 305H from microbolometers below the microbolometer 305H (e.g., isolate from the microbolometers 305J and 305I).

In a similar manner, remaining microbolometers of the microbolometer string 305 may be selected, for example, row-by-row in a sequential manner. After sampling the microbolometers 305A-J, the control signals $EN_A$ through $EN_L$ may be reasserted, while the control signals $RS_A$ through $RS_J$ are in a deasserted state and the control signals $SH_A$ through $SH_J$ are in an asserted state. In an aspect, such a state of the selection circuitry is shown in FIG. 3A. In an aspect, by closing the BS switches 315A-J and switches 320A-L in this manner, a detrimental parasitic resistance and capacitance characteristics may be reduced (e.g., minimized) and potential defects may be isolated, thus providing improved microbolometer FPA performance.

Although not shown, readout of the microbolometers 305B and 305G and readout of the microbolometers 305A and 305F may be performed via a sequence similar to that shown in FIGS. 3A-3F. Furthermore, although the timing diagram 400 is provided for the top half of the microbolometer string 305, the timing diagram 400 may also apply to the bottom half of the microbolometer string 305 (e.g., the timing diagram for the bottom half may be identical or nearly identical with some small timing differences). For example, with reference to the timing diagram 400, the signal levels for the $RS_E$, $SH_E$, and $EN_E$ during the portions 405, 410, 415, 420, 425, and any remaining portion of the timing diagram 400 correspond to the signal levels for the $RS_J$, $SH_J$, and $EN_K$, respectively. As another example, the signal levels for $RS_A$, $SH_A$, and $EN_A$ during the portions 405, 410, 415, 420, 425, and any remaining portion of the timing diagram 400 correspond to the signal levels for $RS_F$, $SH_F$, and $EN_G$, respectively. In this regard, the top and bottom halves of the microbolometer string 305 may be considered to be symmetric or otherwise mirror each other in operation. With reference to the timing diagram 400, in an aspect, the top half of the microbolometer string 305 is operated such that one microbolometer is read out (e.g., sampled) per line time. In this aspect, in performing readout of one microbolometer in the top half in parallel with readout of one microbolometer in the bottom half, the microbolometer string 305 is operated to provide two read outs (e.g., samples) per line time.

It is noted that ellipses above the microbolometer 305E and below the microbolometer 305J in FIGS. 3A-3F indicate that one or more additional microbolometers are present above the microbolometer 305E and below the microbolometer 305J or no microbolometers are present above the microbolometer 305E and below the microbolometer 305J. In an embodiment, when there are microbolometers above the microbolometer 305E and below the microbolometer 305J, simultaneous read out of the microbolometer string may begin from a topmost and a bottommost microbolometer of the microbolometer string and proceed in pairs of readouts from top half and bottom half toward the center microbolometers 305A and 305F.

Thus, using various embodiments, multiple microbolometers within a same microbolometer string (e.g., 305) may be read out (e.g., sampled) at the same time to increase the frame rate for a given array size. In some aspects, two microbolometers within the microbolometer string may be read out simultaneously or substantially simultaneously, while reducing (e.g., minimizing) crosstalk associated with sampling multiple microbolometers that are connected together in the same string (e.g., same row or same column of a microbolometer array). In this regard, two pixels (e.g., microbolometers) of a shared microbolometer string can be sampled with mitigated crosstalk to allow for high speed sampling desirable, for example, in large arrays and/or for high frame rates. For example, when two microbolometers of a microbolometer string are sampled at a time, a microbolometer string (e.g., column) with 1024 microbolometers can be sampled in around the same time as a microbolometer string with 512 microbolometers that has a single microbolometer sampled at a time. In some cases, microbolometers attached together in the microbolometer string may be shorted out (e.g., via their respective BS switches) to minimize a time constant (e.g., RC time constant) of an entire microbolometer string and may be opened to be used as isolation (e.g., to minimize an impact of column-to-column shorts). In an embodiment, multiple microbolometers may be sampled while maintaining minimal crosstalk between the multiple microbolometers being read out at the same time.

As microbolometers are biased and have different scene content on them (e.g., each microbolometer captures a different portion of a scene), a current drawn through the ground (e.g., ground 330 and 335 for the top half and bottom half, respectively, of the microbolometer string 305) changes during readout of different microbolometers. In some cases, separation of the grounds for the top and bottom halves of the microbolometer array may reduce crosstalk between the top and bottom halves of the microbolometer array. A separate bias may be used to allow two different microbolometers to be read out simultaneously or substantially simultaneously.

With reference to FIGS. 3A-3F, with the separate grounds 330 and 335, the current drawn by the pairs of microbolometers (e.g., one microbolometer of the top half and one microbolometer of the bottom half) may be sunk to their respective grounds, with microbolometers of the top half sinking their current through the ground 330 and microbolometers of the bottom half sinking their current through the ground 335, such that the current is isolated between the top and bottom halves of the microbolometer array. Due to the separation of the grounds for the top and bottom halves, the current change on the bottom half of the microbolometer array is generally independent of the current change on the top half of the microbolometer array.

In an embodiment, as shown in FIGS. 3A-3F and 4, when sampling two microbolometers at a time rather than one, two microbolometers may be read starting from ends of the microbolometer string (e.g., topmost microbolometer and bottommost microbolometer of the microbolometer string). Subsequent pairs of simultaneously sampled microbolometers are incrementally closer to a center of the microbolometer string, with the last pair of microbolometers sampled being in the center of the microbolometer string. In the microbolometer string 305, the last pair of microbolometers are the microbolometers 305A and 305F. In a case that the number of microbolometers in the microbolometer string is odd, the first read out (e.g., the microbolometer farthest from the center microbolometers) or the last read out may be of a single microbolometer.

In some aspects, as the microbolometers from each half of the microbolometer array are sampled from an edge (e.g., an end) of each microbolometer string toward the center of the microbolometer string, the microbolometer string changes from being grounded to being at the bias level, with transition points being at the microbolometers that are currently being sampled. The microbolometers that have just been sampled is not shorted out with the BS switch in order to provide isolation (e.g., from column-to-column shorts), while other microbolometers in the string are shorted out in order to minimize a time constant (e.g., RC time constant) of the entire microbolometer string. Column-to-column shift defects may exhibit high noise and crosstalk. In some cases, read out from the edges of the string toward the center of the string may help reduce crosstalk relative to a case of reading from the center to the edges. In these cases, the center microbolometers are held at ground for the longest period of time prior to read out, relative to the other microbolometers of the microbolometer string. In some cases, reading from the center to the edges may cause a respective bias to be driven onto the lines 350 and 355, which may hold the center microbolometers as well as microbolometers above (e.g., for the top half of the microbolometer string) and below (e.g., for the bottom half of the microbolometer string) the center microbolometers to the respective bias.

In an embodiment, at the center of the microbolometer string, the center two microbolometers 305A and 305F share a contact (e.g., 310A) and do not have an isolation microbolometer between them, such that the grounds 330 and 335 are shared (e.g., connected at the center point). In FIGS. 3A-3F, the shared ground contact has the switch 320A to the ground 330 and the switch 320G to the ground 335, and thus current may be split approximately in half between the grounds 330 and 335. In some cases, while the center microbolometers 305A and 305F are associated with reduced or no isolation of the ground 330 and 335 (e.g., relative to the other microbolometers), the crosstalk at these center microbolometers 305A and 305F may generally be less of a concern as neighboring pixel crosstalk generally is associated with a less stringent requirement than non-adjacent pixel crosstalk.

In general, neighboring pixel crosstalk may have a smaller impact to scene quality, with other contributing factors of neighboring pixel crosstalk already being present (e.g., such as due to optical blur). Furthermore, scenes tend to have gradual transitions over multiple pixels. In this regard, the image data between the two adjacent center microbolometers 305A and 305F may capture close portions of a scene. For instance, such crosstalk between the two adjacent center microbolometers 305A and 305F is in contrast to crosstalk between more distance microbolometers, such as crosstalk between a topmost microbolometer and a bottommost microbolometer, which generally image different portions of a scene and may thus adversely affect image quality and user experience if not mitigated. For example, by reading the microbolometers from edge to center for both halves of the microbolometer string, crosstalk during sampling may need to be mitigated such that a bright scene at a top (or bottom) of the microbolometer array does not impact the image at the bottom (or top) of the microbolometer array.

With reference to FIGS. 3A-3F, the grounds 330 and 335 are not completely separate since they are connected through shorted halves of the microbolometer string 305, which may provide a lower impedance connection between the top and bottom halves of the microbolometer string 305. While the resistance through multiple switches provides some isolation between the grounds 330 and 335, such resistance may have an associated crosstalk. In some embodiments, to provide better isolation between the separate grounds (e.g., grounds 330 and 335) and the top and bottom halves, in addition to having BS switches opened for the currently sampled microbolometer and the adjacent microbolometer previously sampled as shown in FIGS. 3A-3F, the BS switch for a next adjacent microbolometer (e.g., the neighboring microbolometer to be sampled after the currently sampled microbolometer) may be opened. The microbolometer resistance acts as isolation between the separate grounds. In this manner, a microbolometer resistance (e.g., thousands to millions of ohms) may act as an isolation from the bottom half array's low impedance ground and the center of the microbolometer array, while a similar high resistance microbolometer may act as an isolation from the top half array's low impedance ground and the center of the microbolometer array. In some cases, this isolation may steer the current sunk by the bottom half of the array through the bottom half array's ground (e.g., 335) and the current sunk by the top half of the array through the top half array's ground (e.g., 330) and reduce crosstalk. As such, the open state of the BS switches of three adjacent microbolometers may provide additional crosstalk isolation. In an aspect, more than two microbolometers adjacent to the microbolometer being sampled may be in the open state to provide additional crosstalk isolation. In some cases, the open state of the BS switches of adjacent microbolometers may reduce resistive crosstalk but increase RC-related crosstalk (e.g., at cold temperatures).

FIGS. 5A through 5F illustrate a sequence of operations of the circuit 300 for facilitating multiple microbolometer selection in accordance with one or more embodiments of the present disclosure. The sequence of operations of the circuit 300 is described with reference to FIG. 6, which illustrates an example timing diagram 600 for the selection circuitry of FIGS. 5A-5F for facilitating read out of the microbolometer string 305 (e.g., a microbolometer array that includes the microbolometer string 305) in accordance with one or more embodiments of the present disclosure.

The description from FIGS. 3A-3F and 4 generally applies to FIGS. 5A-5F and 6, respectively, with examples of differences between FIGS. 3A-3F and 4 and FIGS. 5A-5F and 6 and other description provided herein for purposes of clarity and simplicity. In an embodiment, relative to FIGS. 3A-3F, the timing techniques and state of the switches used for FIGS. 5A-5F may provide additional crosstalk isolation. In an aspect, the operation (e.g., states of the various switches) associated with FIG. 5A matches those previously shown in FIG. 3A.

Figure 5A:
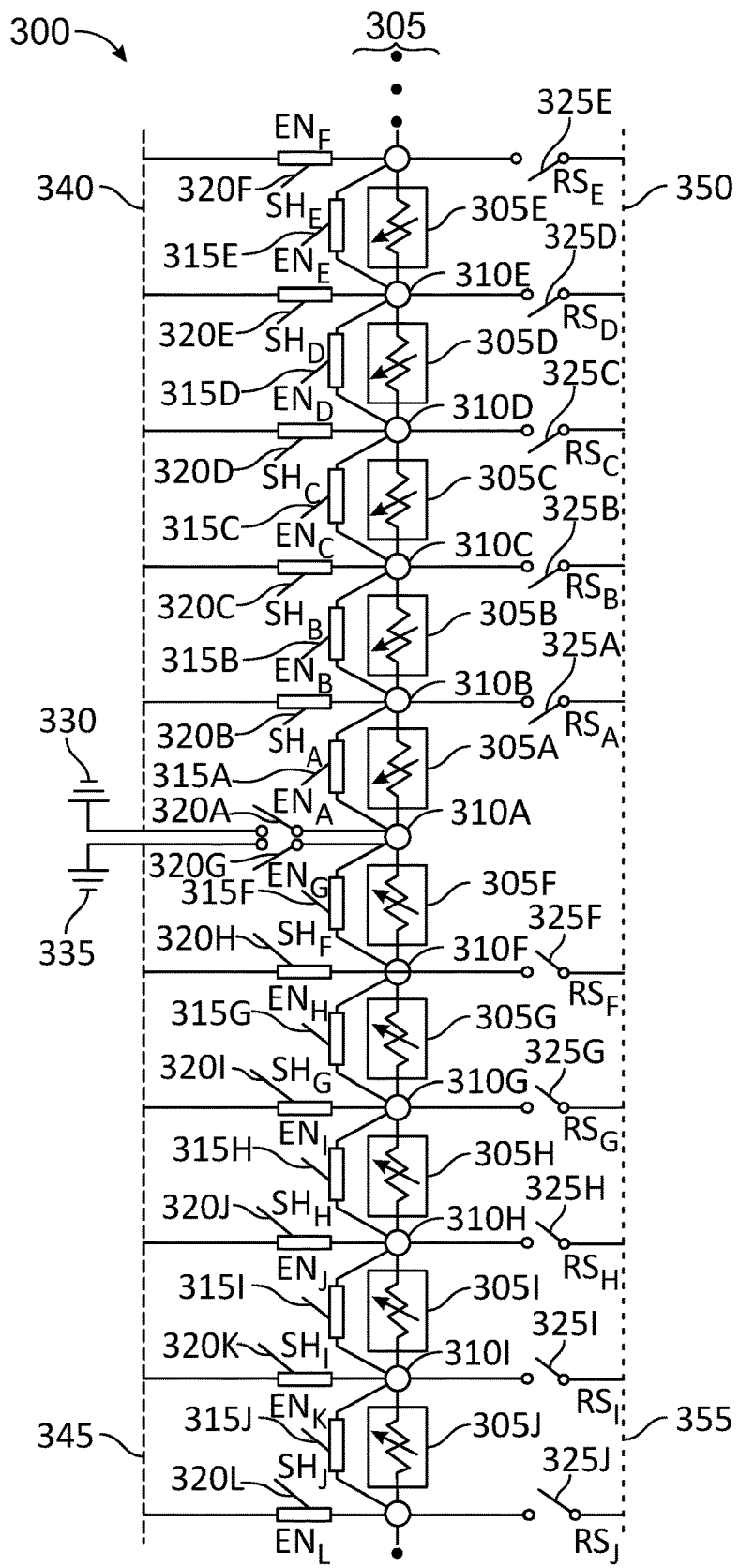
FIGS. 5A through 5F illustrate a sequence of operations of a circuit with a microbolometer string and an associated selection circuitry for facilitating multiple microbolometer selection for simultaneous readout in accordance with one or more embodiments of the present disclosure.
Figure 5B:
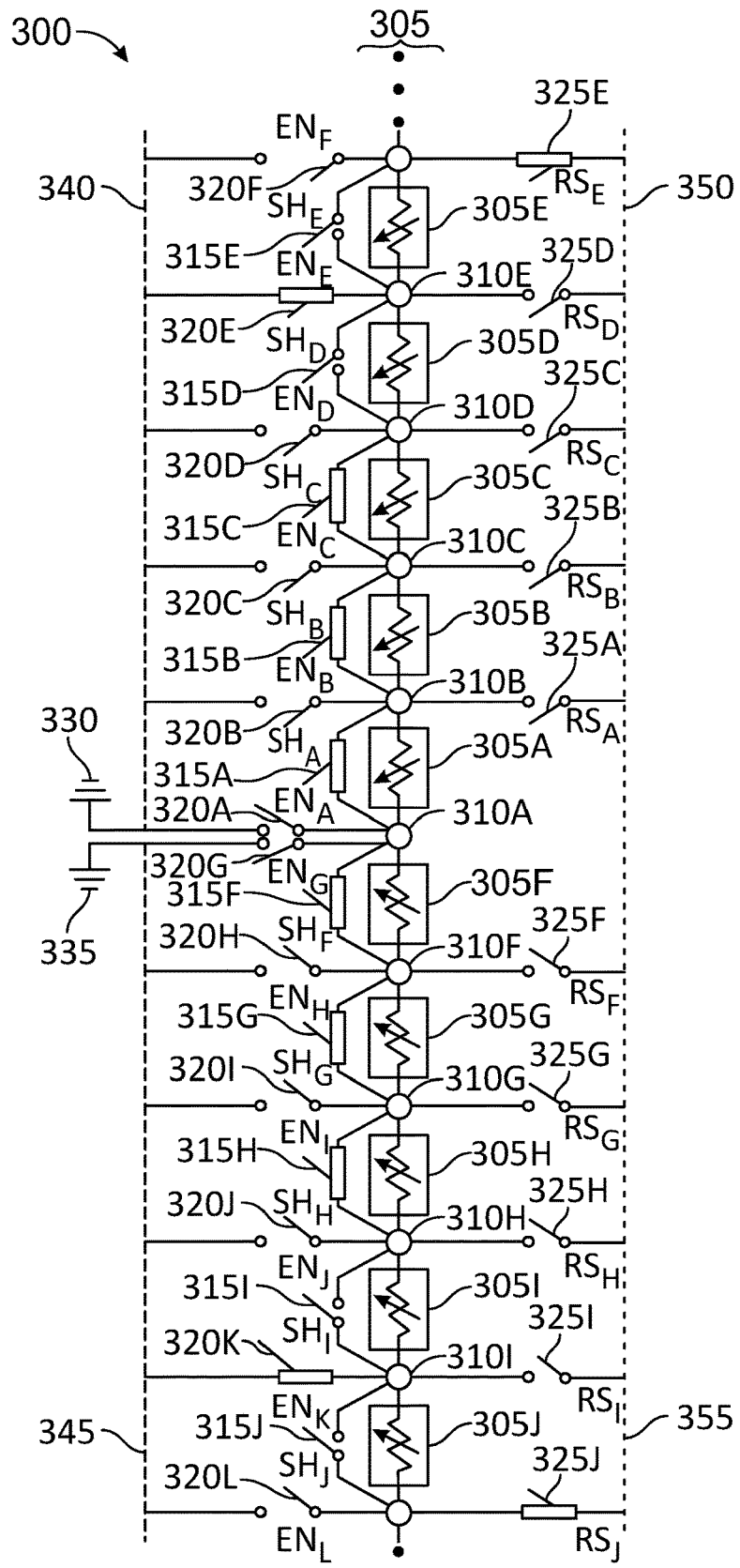

In FIG. 5B, simultaneous or substantially simultaneous read out is facilitated for the pixel values captured by the microbolometer 305E and 305J of the top half and bottom half, respectively, of the microbolometer string 305. To facilitate read out of the microbolometer 305E, the BS switch 315D is opened (e.g., to provide additional crosstalk isolation), in addition to the switch 320E and 325E being closed and the BS switch 315E being opened as shown in FIG. 3B. Similarly, to facilitate read out of the microbolometer 305J, the BS switch 315I is opened, in addition to the switch 320K and switch 325J being closed and the BS switch 315J being opened.

Figure 6:
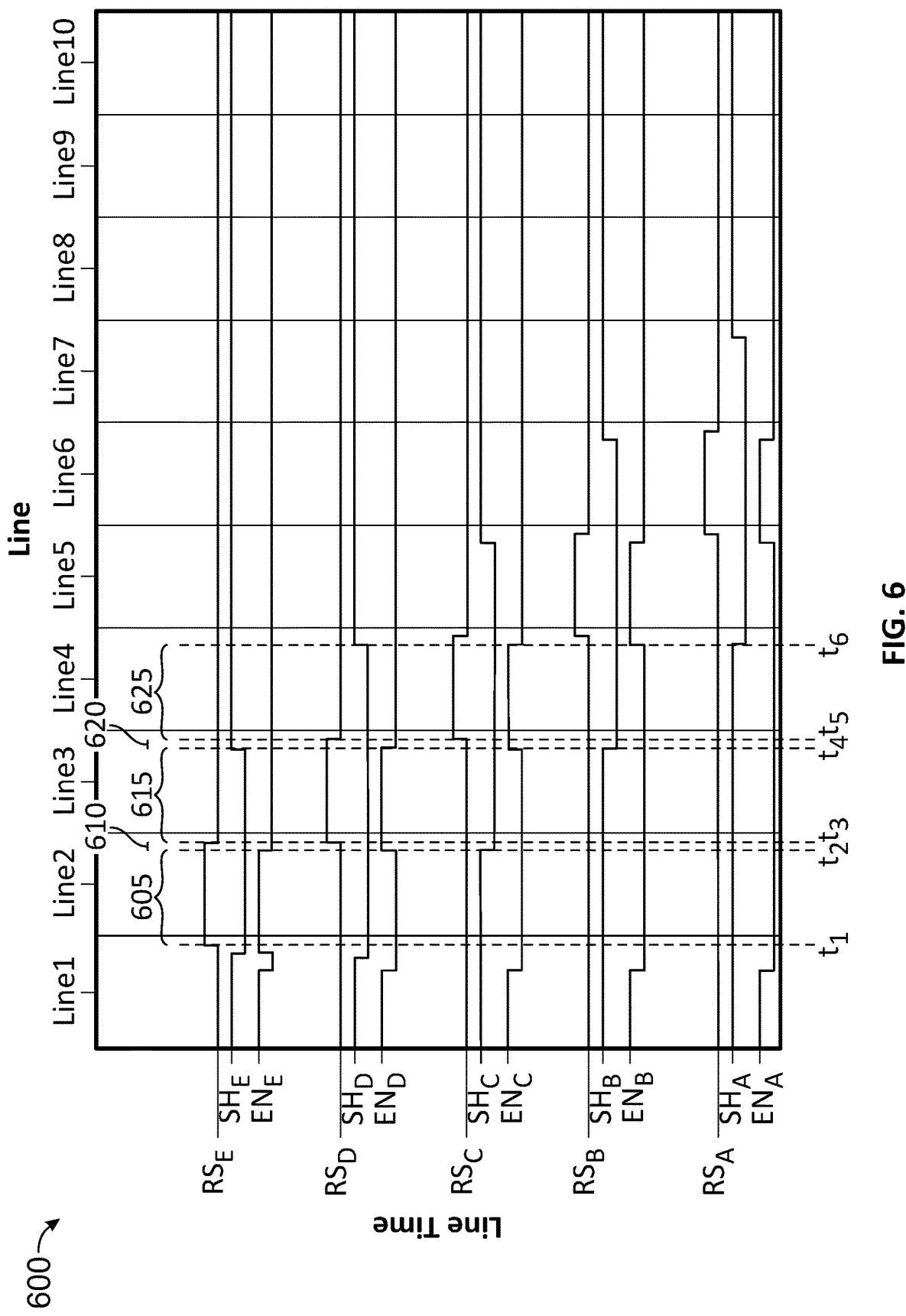
FIG. 6 illustrates an example timing diagram for the selection circuitry of FIGS. 5A-5F for facilitating multiple microbolometer selection for simultaneous readout of the microbolometer string in accordance with one or more embodiments of the present disclosure.

In an aspect, a portion 605 of the timing diagram 600 is associated with operation of the microbolometer string 305 as shown in FIG. 5B. The portion 605 goes from a time $t_1$ to a time $t_2$. At a time $t_1^+$ (e.g., immediately after time $t_1$ shown in FIG. 6), the $RS_E$ and $EN_E$ control signals are asserted (e.g., logic high) and the $SH_E$ control signal is deasserted (e.g., logic low), while the $SH_D$, $RS_D$, and $EN_D$ control signals are deasserted. With regard to the other control signals, the $SH_C$, $SH_B$, and $SH_A$ control signals are asserted, while the $RS_C$, $EN_C$, $RS_B$, $EN_B$, $RS_A$, and $EN_A$ control signals are deasserted. As shown in FIG. 6, the SHD control signal is deasserted prior to the RSE control signal being asserted.

Figure 5C:
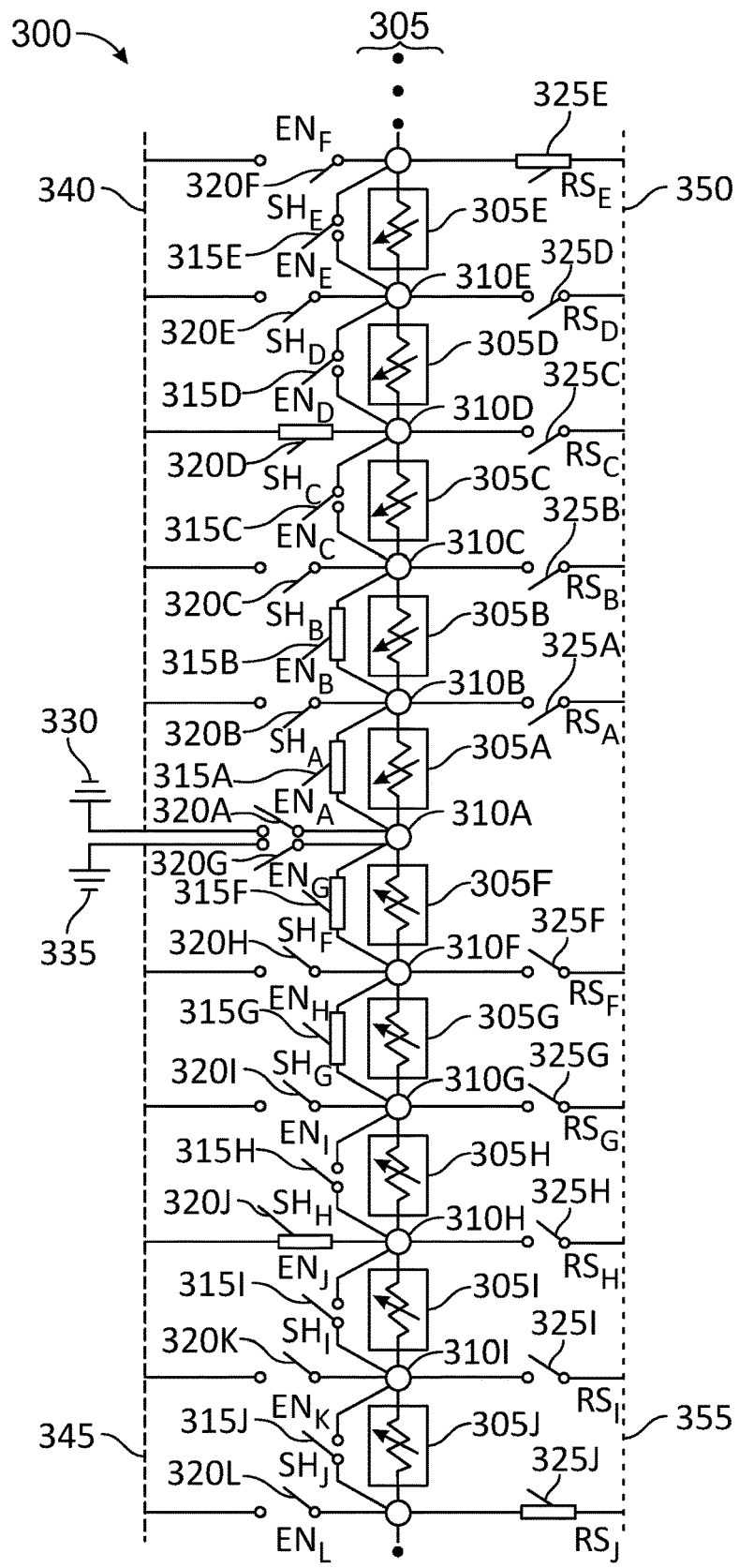

In FIG. 5C, the BS switch 315C is opened, in addition to the switch 320E being opened, BS switch 315D being opened (e.g., remaining opened), and switch 320D being closed as shown in FIG. 3C. Similarly, the BS switch 315H is opened, in addition to the switch 320K being opened, BS switch 315I being opened, and switch 320J being closed as shown in FIG. 3C. In an aspect, a portion 610 of the timing diagram 600 is associated with operation of the microbolometer string 305 as shown in FIG. 5C. The portion 610 goes from a time $t_2$ to a time $t_3$. At a time $t_2^+$, the $RS_E$, $EN_D$, $SH_B$, and $SH_A$ control signals are asserted and the $SH_E$, $EN_E$, $RS_D$, $SH_D$, $RS_C$, $SH_C$, $EN_C$, $RS_B$, $EN_B$, $RS_A$, and $EN_A$ are deasserted.

Figure 5D:
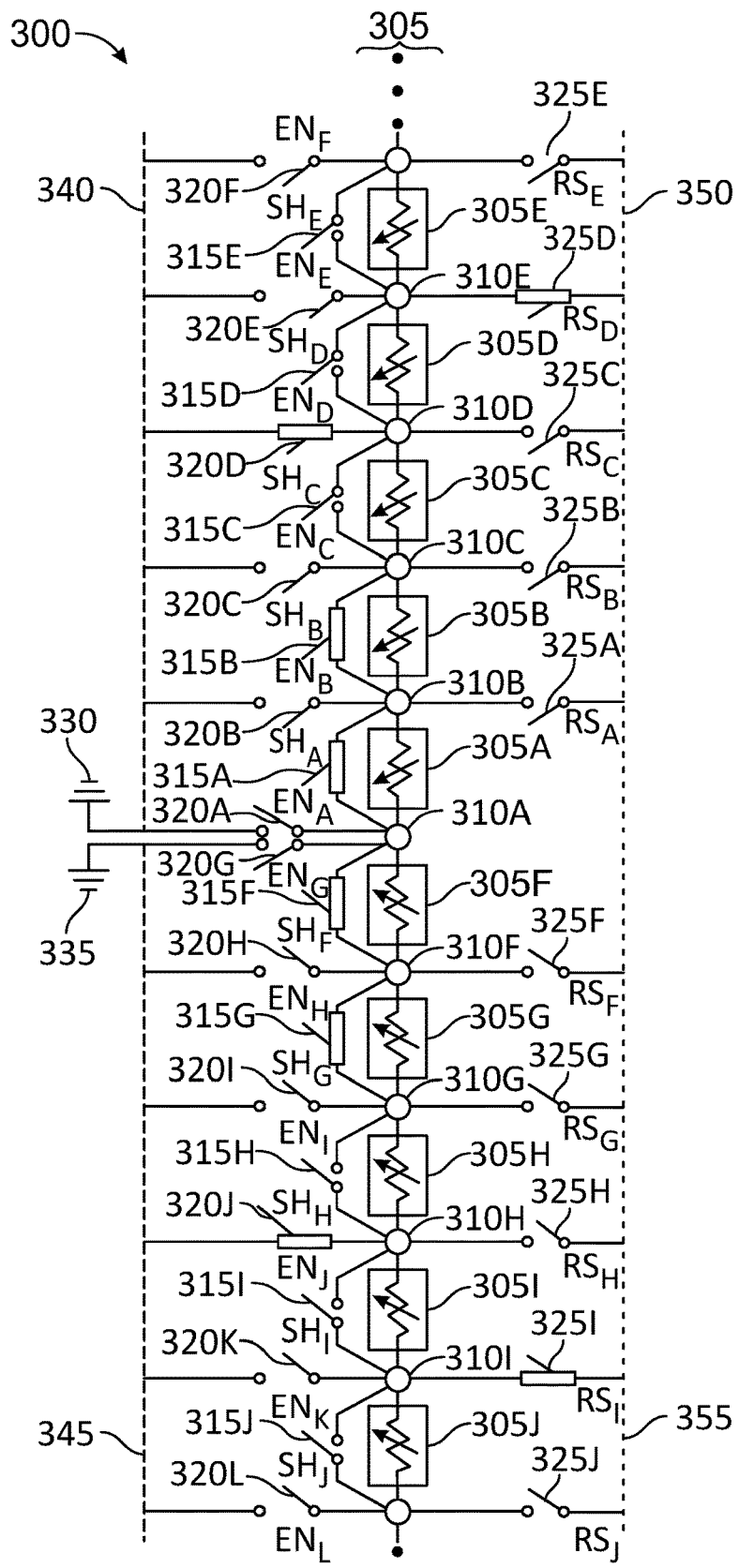

In FIG. 5D, the pixel values captured by the microbolometer 305D and 305I of the top half and bottom half, respectively, of the microbolometer string 305 are read out simultaneously or substantially simultaneously. To allow read out of the microbolometer 305D, the switch 325D is closed and switch 325E is opened. To allow read out of the microbolometer 305I, the switch 325I is closed and switch 325J is opened. In an aspect, a portion 615 of the timing diagram 600 is associated with operation of the microbolometer string 305 as shown in FIG. 5D. The portion 615 goes from a time $t_3$ to a time $t_4$. At a time $t_3^+$, the $RS_D$, $EN_D$, $SH_B$, and $SH_A$ control signals are asserted and the $RS_E$, $SH_E$, $EN_E$, $SH_D$, $RS_C$, $SH_C$, $EN_C$, $RS_B$, $EN_B$, $RS_A$, and $EN_A$ are deasserted. Relative to FIGS. 3C-3D, having the additional BS switches 315C and 315H opened during read out of the microbolometers 305D and 305I, respectively, in FIGS. 5C-5D may provide additional crosstalk isolation.

Figure 5E:
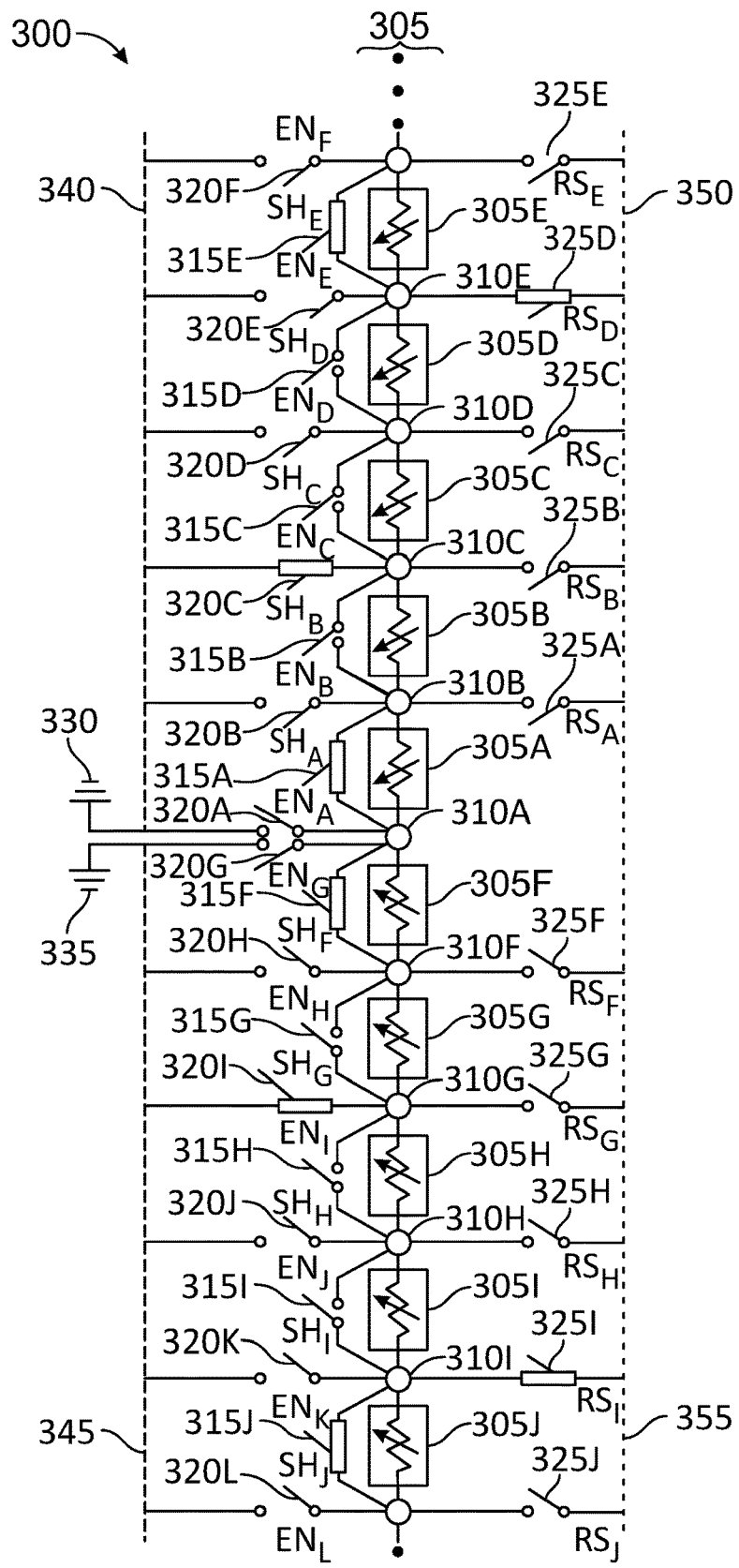

In FIG. 5E, the BS switch 315B is opened, in addition to the switch 320D being opened, BS switch 315C being opened, and switch 320C being closed as shown in FIG. 3E. Similarly, the BS switch 315G is opened, in addition to the switch 320J being opened, BS switch 315H being opened, and switch 320I being closed as shown in FIG. 3E. The BS switches 315E and 315J are closed. In an aspect, a portion 620 of the timing diagram 600 is associated with operation of the microbolometer string 305 as shown in FIG. 5E. The portion 620 goes from a time $t_4$ to a time $t_5$. At a time $t_4^+$, the $SH_E$, $RS_D$, $EN_C$, and $SH_A$ control signals are asserted and the $RS_E$, $EN_E$, $SH_D$, $EN_D$, $RS_C$, $SH_C$, $RS_B$, $SH_B$, $EN_B$, $RS_A$, and $EN_A$ are deasserted.

Figure 5F:
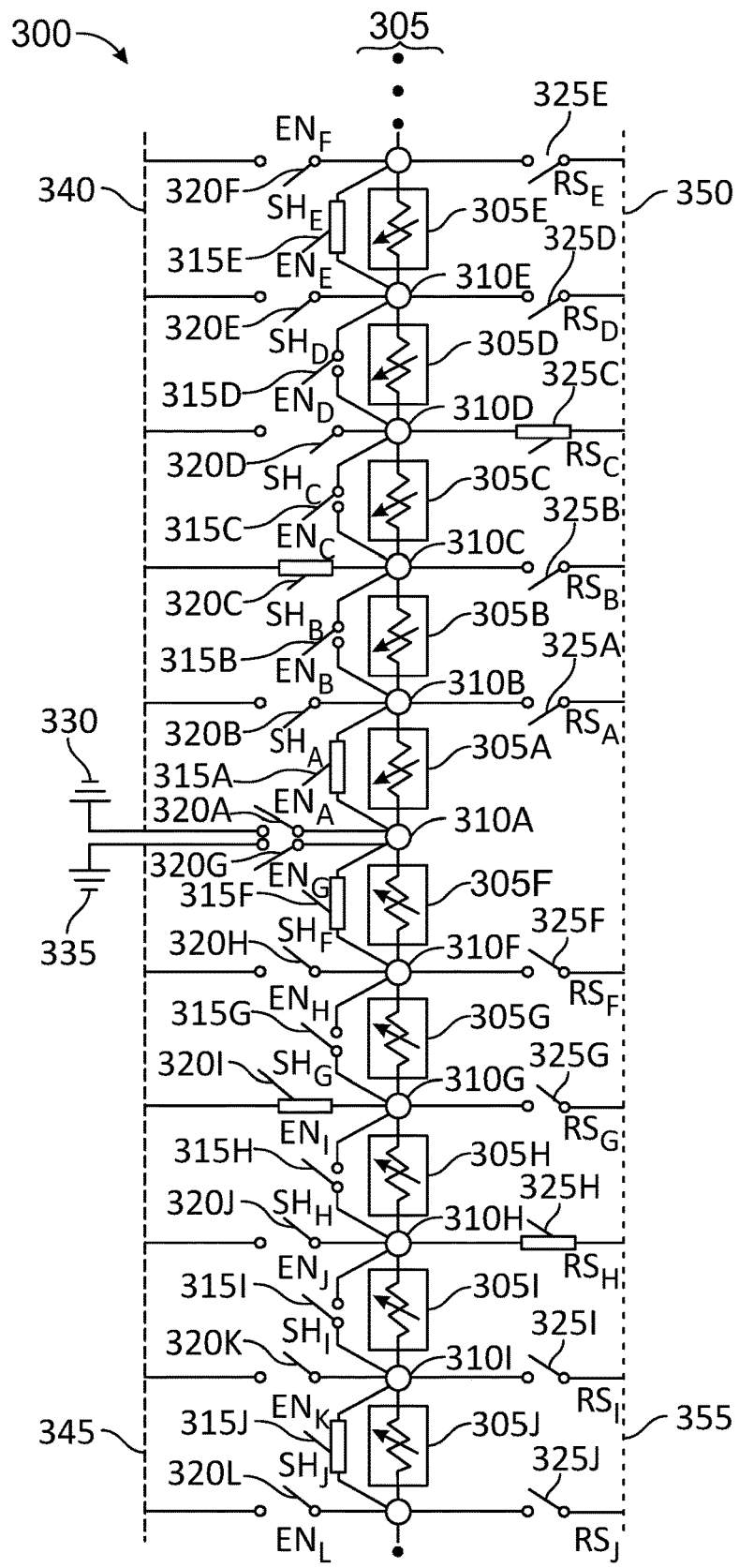

In FIG. 5F, the pixel values captured by the microbolometer 305C and 305H of the top half and bottom half, respectively, of the microbolometer string 305 are read out simultaneously or substantially simultaneously. To allow read out of the microbolometer 305C, the switch 325C is closed and switch 325D is opened. To allow read out of the microbolometer 305H, the switch 325H is closed and switch 325I is opened. In an aspect, a portion 625 of the timing diagram 600 is associated with operation of the microbolometer string 305 as shown in FIG. 5F. At a time $t_5^+$, the $SH_E$, $RS_C$, $EN_C$, and $SH_A$ control signals are asserted and the $RS_E$, $EN_E$, $RS_D$, $SH_D$, $EN_D$, $SH_C$, $RS_B$, $SH_B$, $EN_B$, $RS_A$, and $EN_A$ are deasserted. Relative to FIGS. 3E-3F, having the additional BS switches 315B and 315G opened during read out of the microbolometers 305C and 305H, respectively, in FIGS. 5E-5F may provide additional crosstalk isolation.

In some embodiments, different portions of read out of a microbolometer string (e.g., 305) may be associated with different microbolometer switching schemes. In one aspect, during an initial portion of read out, a first microbolometer switching scheme may be used in which microbolometer switching may be implemented by opening the BS switch corresponding to the microbolometer currently being sampled and the BS switch corresponding to the adjacent microbolometer that was previously sampled (e.g., see for example FIGS. 3A-3F). After such an initial portion of read out, a second microbolometer switching scheme may be used in which microbolometer switching may be implemented by opening the BS switches corresponding to the microbolometer currently being sampled and the BS switches of the two microbolometers adjacent to the microbolometer current being sampled (e.g., see for example FIGS. 5A-5F). In some cases, such an initial portion of the read out operation may help overcome RC delays that can occur due to large changes to the bias level during a first line (or first few lines) coupled with highly resistive microbolometers (e.g., high resistance due to design and/or cold temperature).

Figure 7:
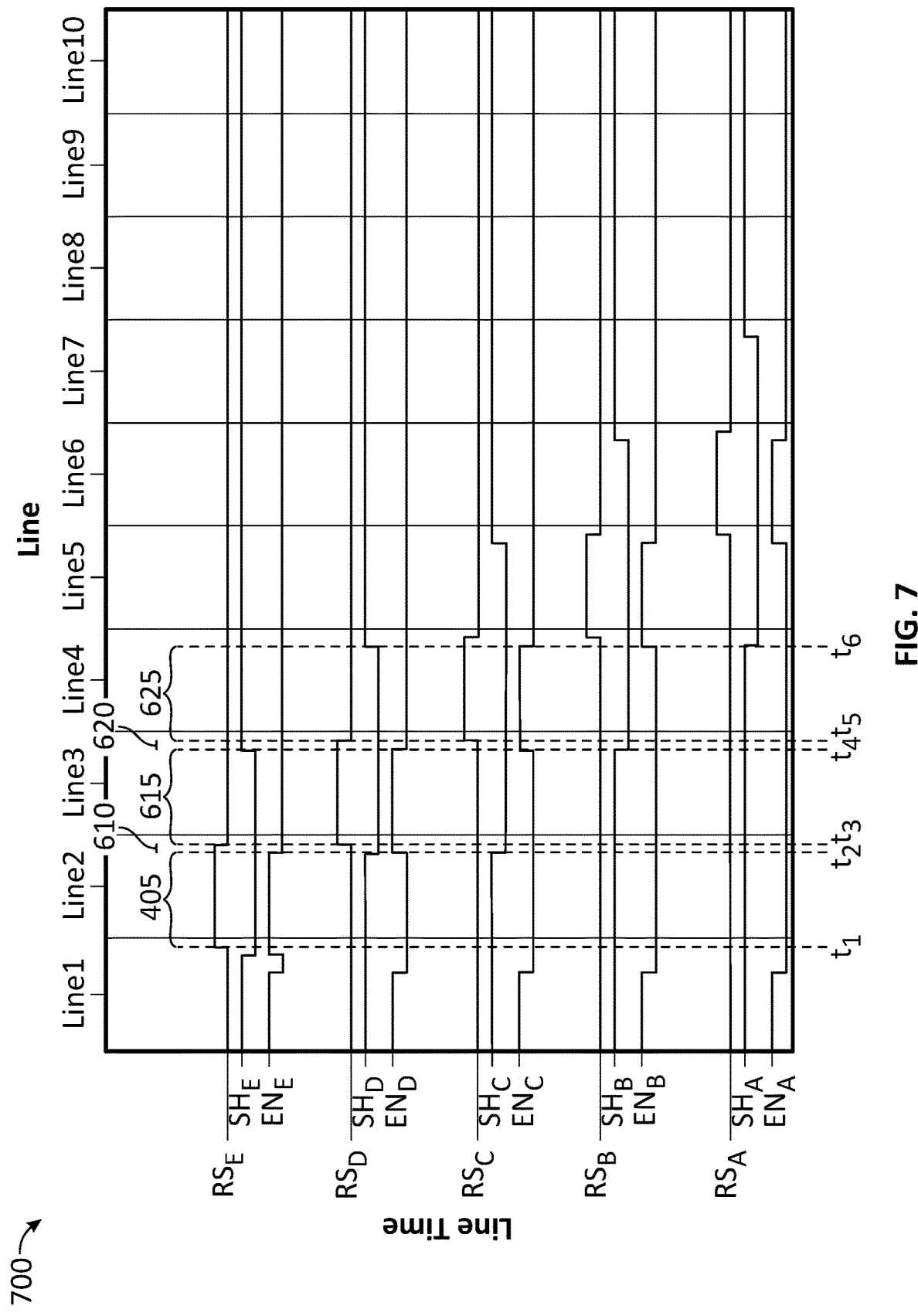
FIG. 7 illustrates an example timing diagram for selection circuitry in accordance with one or more embodiments of the present disclosure.

In one example, with reference to FIGS. 3A-3F and 5A-5F, the sequence of operations of the circuit 300 may be provided, in order, by FIGS. 3A and 3B (e.g., single adjacent microbolometer opened for each sampled microbolometer), followed by FIGS. 5C, 5D, 5E, and 5F (e.g., two adjacent microbolometers opened for each sampled microbolometer). FIG. 7 illustrates a timing diagram 700 of such a case, where the timing diagram 700 has the portion 405 corresponding to FIG. 4 and the portions 610, 615, 620, and 625 corresponding to FIG. 6. Although the foregoing description and FIG. 7 provide a case in which a first microbolometer switching scheme is utilized to facilitate a first read out and subsequent readouts utilize a second microbolometer switching scheme, in other cases a microbolometer switching scheme may be utilized for multiple read outs prior to transitioning to a different microbolometer switching scheme. In addition, more than two different types of microbolometer switching schemes may be utilized depending on application.

In an embodiment, a readout circuit (e.g., 115) and/or processing circuit (e.g., 120) may provide an appropriate control signal to set a microbolometer array to operate using a selected microbolometer switching scheme or a sequence of selected microbolometer switching schemes. In some cases, the readout circuit and/or processing circuit may provide control signals or cause control signals to be generated/provided to implement (e.g., effectuate) different microbolometer switching schemes to cause appropriate opening or closing of the different switches of the microbolometer array dependent on application.

Thus, using various embodiments, multiple microbolometers within a same microbolometer string (e.g., row or column) may be read out (e.g., sampled) at the same time to increase the frame rate for a given array size, while reducing (e.g., minimizing) crosstalk associated with sampling multiple microbolometers that are connected together in the same string (e.g., same row or same column). Higher sampling rate associated with such embodiments may be used in applications associated with larger microbolometer arrays and/or higher frame rates. In some cases, the microbolometer may include serially-connected microbolometers that share contacts between adjacent microbolometers within the microbolometer string and between adjacent microbolometer strings.

Where applicable, various embodiments provided by the present disclosure can be implemented using hardware, software, or combinations of hardware and software. Also where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A device, comprising:
   a plurality of microbolometers comprising a first set of serially-connected microbolometers and a second set of serially-connected microbolometers;

a first plurality of switches, wherein each switch of the first plurality is configured to selectively short a respective one of the plurality of microbolometers;

a second plurality of switches, wherein each switch of the second plurality is configured to selectively couple a respective one of the plurality of microbolometers to ground;

a third plurality of switches, wherein each switch of the third plurality is configured to selectively provide a bias signal to a respective one of the plurality of microbolometers; and a processing circuit configured to configure the first plurality, second plurality, and third plurality of switches to cause simultaneous read out of one microbolometer of the first set and one microbolometer of the second set.

2. The device of claim 1, wherein a first microbolometer of the first set shares a contact with a first microbolometer of the second set.

3. The device of claim 2, wherein:

a center of the plurality of microbolometers includes the first microbolometer of the first set and the first microbolometer of the second set;

the processing circuit is configured to:

for a first read out, cause simultaneous read out of a second microbolometer of the first set and a second microbolometer of the second set; and for a second read out subsequent to the first read out, cause simultaneous read out of a third microbolometer of the first set and a third microbolometer of the second set, wherein the third microbolometer of the first set is closer to the center than the second microbolometer of the first set, and wherein the third microbolometer of the second set is closer to the center than the second microbolometer of the second set.

4. The device of claim 3, wherein a number of microbolometers between the first and third microbolometers of the first set is the same as a number of microbolometers between the first and third microbolometers of the second set.

5. The device of claim 1, wherein:

the second plurality of switches comprises a first set of switches and a second set of switches, each switch of the first set of switches is configured to selectively couple a respective one of the first set of microbolometers to a first ground, and each switch of the second set of switches is configured to selectively couple a respective one of the second set of microbolometers to a second ground.

6. The device of claim 1, wherein:

the third plurality of switches comprises a first set of switches and a second set of switches, each switch of the first set of switches is configured to selectively provide a first bias voltage via a first bias line to a respective one of the first set of microbolometers, and each switch of the second set of switches is configured to selectively provide a second bias voltage via a second bias line to a respective one of the second set of microbolometers.

7. The device of claim 1, wherein each microbolometer of the plurality of microbolometers shares a contact with one or more adjacent microbolometers.

8. The device of claim 1, wherein:

the first plurality of switches comprises a first set of switches and a second set of switches, each switch of the first set of switches is configured to selectively short a respective one of the first set of microbolometers, and each switch of the second set of switches is configured to selectively short a respective one of the second set of microbolometers.

9. The device of claim 8, wherein, during simultaneous read out of a first microbolometer of the first set of microbolometers and a first microbolometer of the second set of microbolometers, the processing circuit is configured to:

configure a first switch of the first set of switches that is parallel to the first microbolometer of the first set of microbolometers to an open state; and configure a first switch of the second set of switches that is parallel to the first microbolometer of the second set of microbolometers to the open state.

10. The device of claim 9, wherein, during simultaneous read out of the first microbolometer of the first set of microbolometers and the first microbolometer of the second set of microbolometers, the processing circuit is further configured to:

configure a second switch of the first set of switches that is parallel to a second microbolometer of the first set of microbolometers to the open state, wherein the first and second microbolometers of the first set of microbolometers are adjacent to each other; and configure a second switch of the second set of switches that is parallel to a second microbolometer of the second set of microbolometers to the open state, wherein the first and second microbolometers of the second set of microbolometers are adjacent to each other.

11. The device of claim 10, wherein, during simultaneous read out of the first microbolometer of the first set of microbolometers and the first microbolometer of the second set of microbolometers, the processing circuit is further configured to:

configure a third switch of the first set of switches that is parallel to a third microbolometer of the first set of microbolometers to the open state, wherein the first microbolometer of the first set of microbolometers is adjacent to the second and third microbolometers of the first set of microbolometers; and configure a fourth switch of the second set of switches that is parallel to a third microbolometer of the second set of microbolometers to the open state, wherein the first microbolometer of the second set of microbolometers is adjacent to the second and third microbolometers of the second set of microbolometers.

12. The device of claim 8, wherein, during simultaneous read out of the first microbolometer of the first set of microbolometers and the first microbolometer of the second set of microbolometers, a current is steered to a first ground via a first bias line and the first microbolometer of the first set of microbolometers and a current is steered to a second ground via a second bias line and the first microbolometer of the second set of microbolometers.

13. The device of claim 12, wherein, during simultaneous read out of the first microbolometer of the first set of microbolometers and the first microbolometer of the second set of microbolometers:

a current is steered to the first ground via the first bias line and a second microbolometer and the first microbolometer of the first set of microbolometers, and a current is steered to the second ground via the second bias line and a second microbolometer and the first microbolometer of the second set of microbolometers, wherein the first and second microbolometers of the first set of microbolometers are adjacent to each other, and wherein the first and second microbolometers of the second set of microbolometers are adjacent to each other.

14. A method, comprising:
providing a plurality of microbolometers comprising a first set of serially-connected microbolometers and a second set of serially-connected microbolometers;
selecting a first microbolometer of the first set and a first microbolometer of the second set;
based on the selected first microbolometer of the first set and the selected first microbolometer of the second set:
configuring a first plurality of switches to selectively short one or more of the plurality of microbolometers;
configuring a second plurality of switches to selectively couple one or more of the plurality of microbolometers to ground; and
configuring a third plurality of switches to selectively provide a respective bias signal to one or more of the plurality of microbolometers; and
simultaneously reading out the selected first microbolometer of the first set and the selected first microbolometer of the second set.

15. The method of claim 14, wherein a second microbolometer of the first set shares a contact with a second microbolometer of the second set, and wherein a center of the plurality of microbolometers includes the second microbolometer of the first set and the second microbolometer of the second set, the method further comprising:
selecting a third microbolometer of the first set and a third microbolometer of the second set; and
subsequent to the simultaneously reading out the selected first microbolometer of the first set and the selected first microbolometer of the second set:
configuring the first, second, and third plurality of switches based on the selected third microbolometer of the first set and the selected third microbolometer of the second set; and
simultaneously reading out the selected third microbolometer of the first set and the selected third microbolometer of the second set.

16. The method of claim 15, wherein:
a number of microbolometers between the first and second microbolometers of the first set is the same as a number of microbolometers between the first and second microbolometers of the second set, and a number of microbolometers between the second and third microbolometers of the first set is the same as a number of microbolometers between the second and third microbolometers of the second set.

17. The method of claim 14, wherein:
the first plurality of switches comprises a first set of switches and a second set of switches,
each switch of the first set of switches selectively shorts a respective one of the first set of microbolometers, and
each switch of the second set of switches selectively shorts a respective one of the second set of microbolometers.

18. The method of claim 17, wherein configuring the first plurality of switches comprises:
configuring a first switch of the first set of switches parallel to the first microbolometer of the first set of microbolometers to an open state; and
configuring a first switch of the second set of switches parallel to the first microbolometer of the second set of microbolometers to the open state.

19. The method of claim 18, wherein configuring the first plurality of switches further comprises:
configuring a second switch of the first set of switches parallel to a second microbolometer of the first set of microbolometers to the open state, wherein the first and second microbolometers of the first set of microbolometers are adjacent to each other; and
configure a second switch of the second set of switches parallel to a second microbolometer of the second set of microbolometers to the open state, wherein the first and second microbolometers of the second set of microbolometers are adjacent to each other.

20. The method of claim 19, wherein configuring the first plurality of switches further comprises:
configuring a third switch of the first set of switches parallel to a third microbolometer of the first set of microbolometers to the open state, wherein the first microbolometer of the first set of microbolometers is adjacent to the second and third microbolometers of the first set of microbolometers; and
configuring a fourth switch of the second set of switches parallel to a third microbolometer of the second set of microbolometers to the open state, wherein the first microbolometer of the second set of microbolometers is adjacent to the second and third microbolometers of the second set of microbolometers.

* * * * *

UNITED STATES PATENT AND TRADEMARK OFFICE
CERTIFICATE OF CORRECTION

| | | |
|---|---|---|
| PATENT NO. | : 11,212,466 B2 | Page 1 of 1 |
| APPLICATION NO. | : 16/909768 | |
| DATED | : December 28, 2021 | |
| INVENTOR(S) | : Simolon et al. | |

It is certified that error appears in the above-identified patent and that said Letters Patent is hereby corrected as shown below:

In the Specification

In Column 11, Line 19, change "3051I" to --305I--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*